(12) United States Patent
Schenk et al.

(10) Patent No.: US 11,341,347 B2
(45) Date of Patent: *May 24, 2022

(54) METHOD FOR INTERACTIVE TRAINING IN THE CLEANING OF A ROOM

(71) Applicant: MIDLAB, INC., Athens, TN (US)

(72) Inventors: Matthew Jon Schenk, Knoxville, TN (US); Sam Matthew Johnston, Knoxville, TN (US); Steven L. Powers, Knoxville, TN (US)

(73) Assignee: Midlab, Inc., Athens, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,113

(22) Filed: Mar. 15, 2021

(65) Prior Publication Data
US 2021/0217324 A1  Jul. 15, 2021

Related U.S. Application Data

(63) Continuation of application No. 16/872,445, filed on May 12, 2020, now Pat. No. 10,990,777, which is a (Continued)

(51) Int. Cl.
*G06K 7/14* (2006.01)
*G06F 16/955* (2019.01)
(Continued)

(52) U.S. Cl.
CPC ....... *G06K 7/1417* (2013.01); *G06F 16/9558* (2019.01); *G06K 7/10386* (2013.01);
(Continued)

(58) Field of Classification Search
CPC .......................... G06K 7/1417; G06F 16/9558
(Continued)

(56) References Cited

U.S. PATENT DOCUMENTS

| | | | | |
|---|---|---|---|---|
| 5,145,377 A | * | 9/1992 | Tarvin | G09B 19/00 434/170 |
| 5,851,117 A | * | 12/1998 | Alsheimer | G09B 19/00 434/219 |

(Continued)

*Primary Examiner* — Allyson N Trail
(74) *Attorney, Agent, or Firm* — Luedeka Neely Group, P.C.

(57) ABSTRACT

A method for interactive training in the cleaning of a room. The method includes the steps of providing a room having a plurality of locations to be cleaned; providing pre-selected janitorial and cleaning products for each of the locations to be cleaned; providing a reader programmed to recognize surface characteristics of the locations to be cleaned and link to a website having information about one or more pre-selected janitorial and cleaning products and the use thereof at the locations to be cleaned; operating the reader to recognize surface characteristics of the locations to be cleaned to create a spatial map of the room; locating a trainee with the reader in the room and operating the reader to display to the trainee the room and selectively display to the trainee displayed information comprising information from the website about the one or more pre-selected janitorial and cleaning products and the use thereof at the locations to be cleaned; and having the trainee interact with the displayed information to select amongst the one or more pre-selected janitorial and cleaning products for each of the locations and thereby selectively access the displayed information for training in selection and use of the pre-selected cleaning and janitorial products for each of the locations in the room.

9 Claims, 31 Drawing Sheets

Related U.S. Application Data continuation-in-part of application No. 16/838,143, filed on Apr. 2, 2020, now Pat. No. 10,929,627, which is a continuation of application No. 16/354,618, filed on Mar. 15, 2019, now Pat. No. 10,664,673, which is a continuation-in-part of application No. 16/256,585, filed on Jan. 24, 2019.

(60) Provisional application No. 62/649,726, filed on Mar. 29, 2018.

(51) Int. Cl.
    *G06K 7/10*     (2006.01)
    *G09B 19/00*     (2006.01)
    *G06V 20/20*     (2022.01)

(52) U.S. Cl.
    CPC ........... *G06K 7/1413* (2013.01); *G06V 20/20* (2022.01); *G09B 19/003* (2013.01)

(58) Field of Classification Search
    USPC ...................................................... 235/462.1
    See application file for complete search history.

(56) References Cited

U.S. PATENT DOCUMENTS

| | | | | |
|---|---|---|---|---|
| 6,120,298 A * | 9/2000 | Jenkins | ..................... | G09B 7/04 434/118 |
| 6,226,961 B1 * | 5/2001 | Gordon | ..................... | G09F 3/00 15/244.4 |
| 6,390,822 B1 * | 5/2002 | Murphy | ................... | G09B 5/04 434/219 |
| 6,500,008 B1 * | 12/2002 | Ebersole | ........... | A62C 99/0081 345/441 |
| 6,589,055 B2 * | 7/2003 | Osborne | .................. | G09B 5/12 434/219 |
| 6,794,352 B2 * | 9/2004 | Svendsen | ............... | A01N 25/34 510/234 |
| 7,536,032 B2 * | 5/2009 | Bell | ...................... | G06F 3/0425 382/103 |
| 7,931,380 B2 * | 4/2011 | Williams | ............... | G03B 15/02 362/18 |
| 8,469,713 B2 * | 6/2013 | Kron | ...................... | G09B 5/065 434/238 |
| 8,600,989 B2 * | 12/2013 | Hull | ........................ | G06K 9/228 707/736 |
| 8,641,421 B2 * | 2/2014 | Midkiff | .................. | G09B 19/06 434/157 |
| 8,702,426 B2 * | 4/2014 | Soto | ................... | G09B 19/0076 434/94 |
| 9,159,166 B2 * | 10/2015 | Finn | ...................... | G06K 9/3208 |
| 9,224,303 B2 * | 12/2015 | Colvin | .................... | G09B 5/06 |
| 9,251,715 B2 * | 2/2016 | Hing | ......................... | G09B 9/05 |
| 9,542,663 B2 * | 1/2017 | Colburn | ................. | G16Z 99/00 |
| 9,646,417 B1 * | 5/2017 | Sowadski | ............. | G06F 3/0346 |
| 9,659,367 B2 * | 5/2017 | Herger | ................... | G16H 40/20 |
| 9,753,950 B2 * | 9/2017 | Schultz | ................. | G06F 16/532 |
| 9,892,132 B2 * | 2/2018 | Vespe | ................. | G06F 16/5846 |
| 2005/0069846 A1 * | 3/2005 | Acevedo | ............... | G09B 19/08 434/156 |
| 2005/0277105 A1 * | 12/2005 | Chickvara | .............. | G09B 19/00 434/369 |
| 2006/0029921 A1 * | 2/2006 | Walther | ............. | G09B 19/0076 434/382 |
| 2006/0121423 A1 * | 6/2006 | Hutchison | .............. | G09B 19/00 434/219 |
| 2009/0112541 A1 * | 4/2009 | Anderson | .......... | G09B 19/0076 703/11 |
| 2010/0028845 A1 * | 2/2010 | Myer | ...................... | G09B 7/02 434/323 |
| 2010/0167249 A1 * | 7/2010 | Ryan | ...................... | G09B 23/30 434/267 |
| 2015/0302769 A1 * | 10/2015 | Johnson | ............. | G09B 19/0076 434/308 |
| 2016/0314620 A1 * | 10/2016 | Reilly | ...................... | G06F 3/033 |
| 2017/0098391 A1 * | 4/2017 | Wu | .......................... | G09B 1/16 |
| 2017/0164802 A1 * | 6/2017 | Cudzilo | ................ | A47L 9/2826 |
| 2017/0323481 A1 * | 11/2017 | Tran | .................... | H04N 5/23212 |

* cited by examiner

METHOD FOR INTERACTIVE TRAINING IN THE CLEANING OF A ROOM

FIELD

This disclosure relates to the field of education and training. More particularly, this disclosure relates to methods for interactive training in the cleaning of a room.

BACKGROUND

Improvement is desired in regard to training cleaning professionals in the appropriate use of time and janitorial and cleaning products. For a given room or rooms or other areas of a facility, it is desired to provide training of cleaning professionals to improve cleaning efficiency in both use of time and use of cleaning products.

Accordingly, what is desired is effective systems and methods for training cleaning professionals in the use of their time and their selection of janitorial and cleaning products.

The systems and methods as described herein are configured to be easily adopted and complementary to a commercial janitorial service of the type that utilizes a staff to effect consistent training among the staff and consistent cleaning of a given room or facility.

SUMMARY

The above and other needs are met by methods for interactive training in the cleaning of a room.

In one aspect, the method includes the steps of providing a room having a plurality of locations to be cleaned; providing pre-selected janitorial and cleaning products for each of the locations to be cleaned; providing a reader programmed to recognize surface characteristics of the locations to be cleaned and link to a website having information about one or more pre-selected janitorial and cleaning products and the use thereof at the locations to be cleaned; operating the reader to recognize surface characteristics of the locations to be cleaned to create a spatial map of the room; locating a trainee with the reader in the room and operating the reader to display to the trainee the room and selectively display to the trainee displayed information comprising information from the website about the one or more pre-selected janitorial and cleaning products and the use thereof at the locations to be cleaned; and having the trainee interact with the displayed information to select amongst the one or more pre-selected janitorial and cleaning products for each of the locations and thereby selectively access the displayed information for training in selection and use of the pre-selected cleaning and janitorial products for each of the locations in the room.

In another aspect, the method includes the steps of providing a room having a plurality of locations to be cleaned; providing pre-selected janitorial and cleaning products for each of the locations to be cleaned; providing a reader programmed to recognize surface characteristics of the locations to be cleaned and link to information about one or more of the pre-selected janitorial and cleaning products and the use thereof at the locations to be cleaned; operating the reader to interface with the locations to be cleaned to link to information about one or more of the pre-selected janitorial and cleaning products and the use thereof at the locations to be cleaned; having a trainee operate the reader to selectively display to the trainee displayed information comprising information about the one or more pre-selected janitorial and cleaning products and the use thereof at the locations to be cleaned; and having the trainee interact with the displayed information to select amongst the one or more pre-selected janitorial and cleaning products for each of the locations and thereby selectively access the displayed information for training in selection and use of the pre-selected cleaning and janitorial products for each of the locations in the room.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
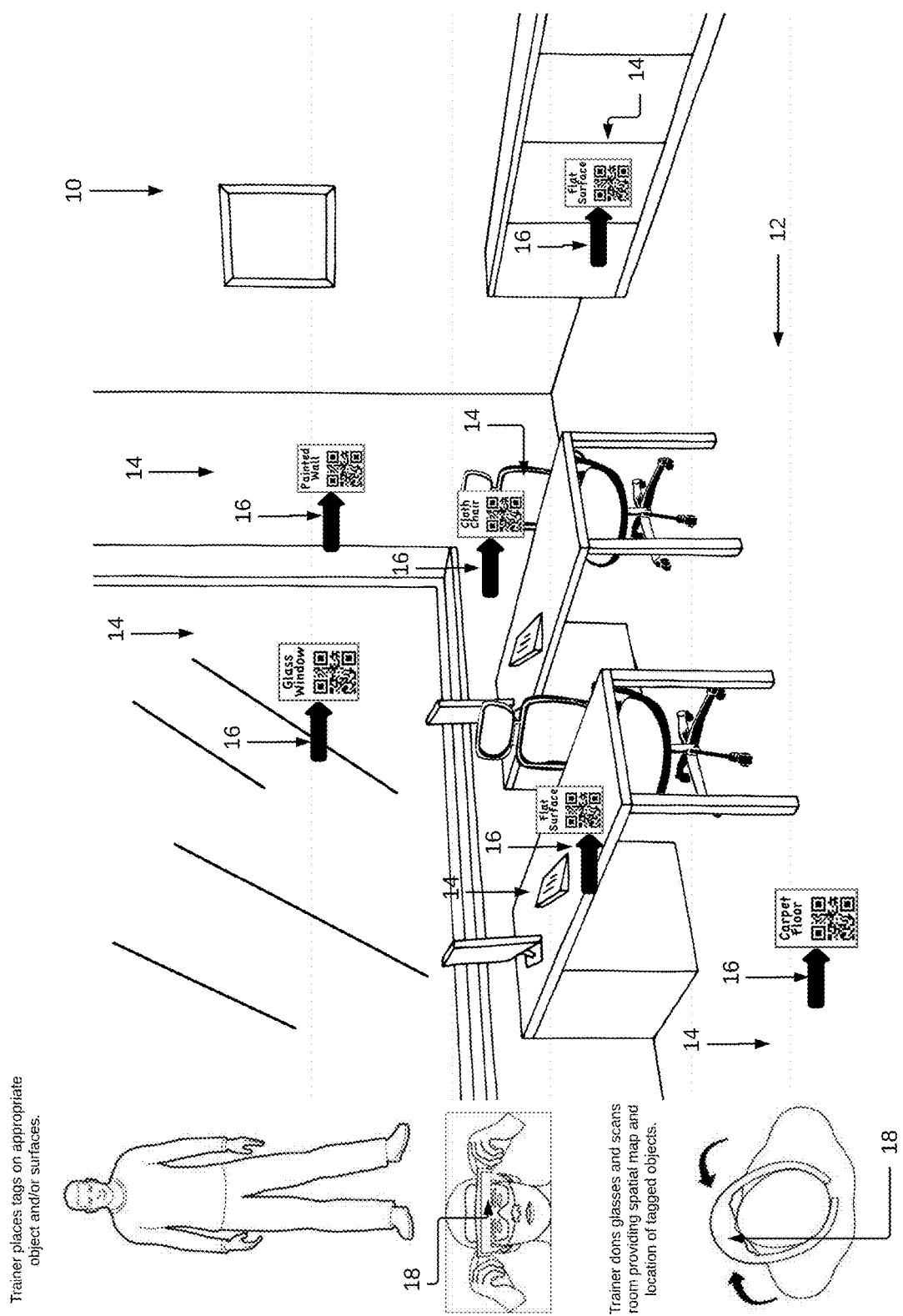
FIGS. 1-12 show aspects of a training system and method according to the disclosure.

With initial reference to FIGS. 1-12 there is shown a training system 10 for training and guiding persons in the use of janitorial and cleaning products according to the disclosure. The system 10 has been observed to facilitate training and guiding cleaning in the use of a wide variety of janitorial and cleaning products for a variety of facilities.

In overview, the system 10 includes a room 12 having a variety of locations 14 to be cleaned. Initially, each of the locations 14 is provided with an optical tag 16 that is readable by a reader 18. For example, a trainer conducting a training session for a trainee will place the optical tags 16 at the locations 14.

The locations 14 are locations within the room 12 that it is desired to train a trainee cleaning professional recommended cleaning procedures using pre-selected janitorial and cleaning products. Examples of the locations 14 include glass, such as found on a window, carpet, flat or hard surfaces such as a laminated desk top or a cabinet, cloth surfaces such as a chair, and a painted wall.

The optical tags 16 associated with the locations 14 may be of various formats and contain information relating to one or more pre-selected janitorial and cleaning products and the use thereof at each one of the particular locations 14. Preferably the optical tags 16 are machine readable optical labels that contain a barcode, such as a mobile 2-dimensional response code and generally known as quick response or QR codes. The barcode contains data that is interfaced with the reader 18 to selectively direct a viewer to a website or application. For example, the optical tags 16 may have codes that are linked to individual website resources for each of the janitorial and cleaning products.

In a preferred embodiment, preferred janitorial and cleaning products for use with the training system 10 have labels specially configured to facilitate proper and effective use of the janitorial and cleaning products, such as janitorial and cleaning products available from Midlab, Inc. of Athens, Tenn. under the mark PLUS LABEL SYSTEM.

As described in more detail below, the optical tags 16 contain information to enable the trainee to access a website having support materials for the pre-selected janitorial and cleaning products, such as training brochures, training posters, product information sheets, product specific webpages, and product training videos configured to facilitate training of the trainee in the selection and use of the pre-selected cleaning and janitorial products.

The reader 18 is desirably provided by smart glasses or wearable computer glasses that can scan the codes of the optical tags 16. The reader 18 also is configured to add images or information alongside or to what the wearer sees through an optical head-mounted display or embedded wireless glasses with transparent heads-up display or augmented reality overlay or the like that has the capability of reflecting projected digital images as well as allowing the user to see through it and to interact with the images or other information.

Returning now to FIG. 1, in use of the system 10 to train a trainee in cleaning of the room 12 using the pre-selected janitorial and cleaning products, a trainer will initially place the tags 16 at the desired locations 14 within the room 12. Next, the trainer will don the reader 18 and scan the room 12 as by moving or looking about the room 12 to enable the reader 18 to detect the optical tags 16. In this regard, the reader 18 is programmed to generate a spatial map of the room 12 with the location of the tags 16 represented by rotating 3-dimensional icons 20 or other indicium or indicia above or adjacent each of the locations 14, and the information of the tags 16 available for viewing as described more fully below.

Figure 2:
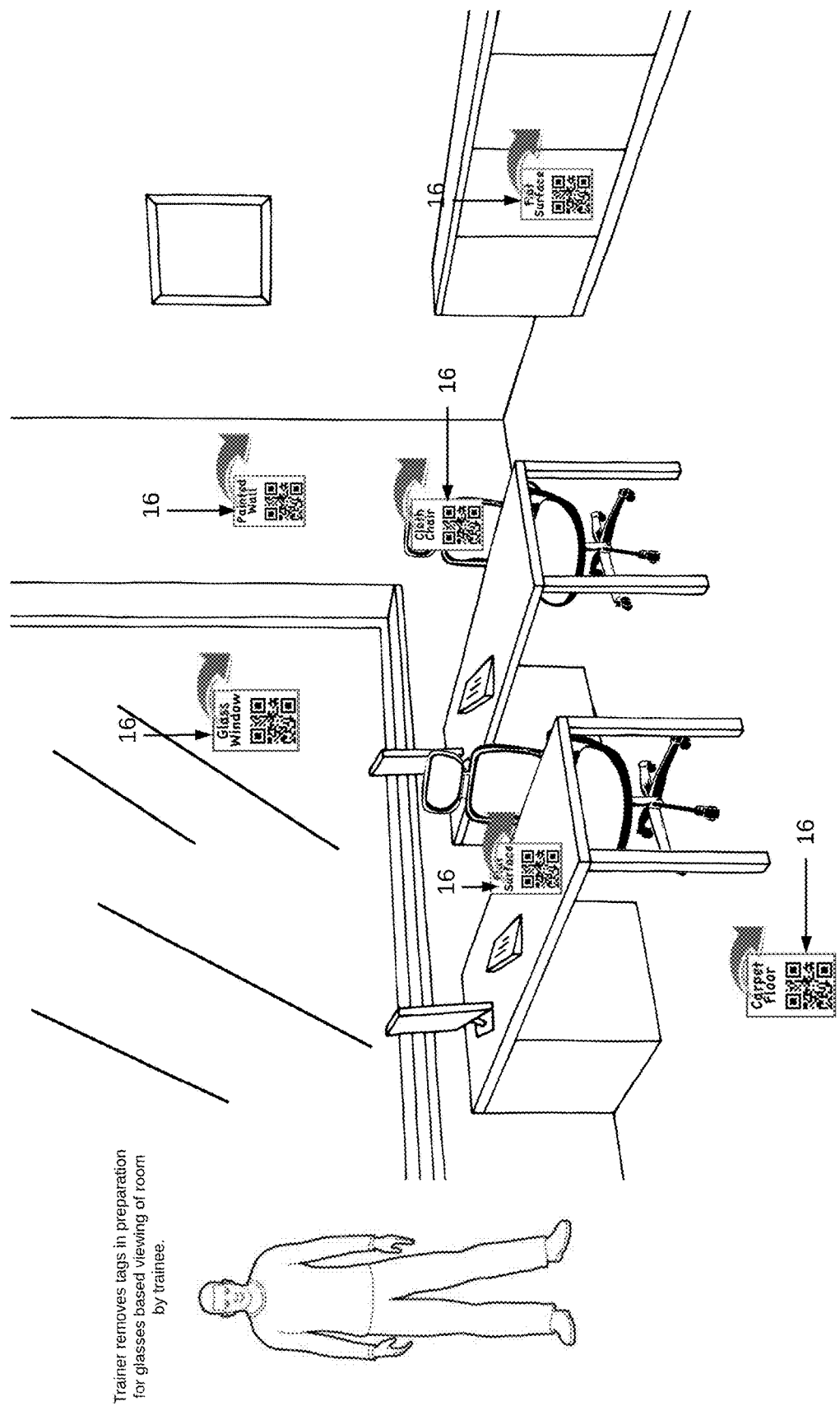
Figure 3:
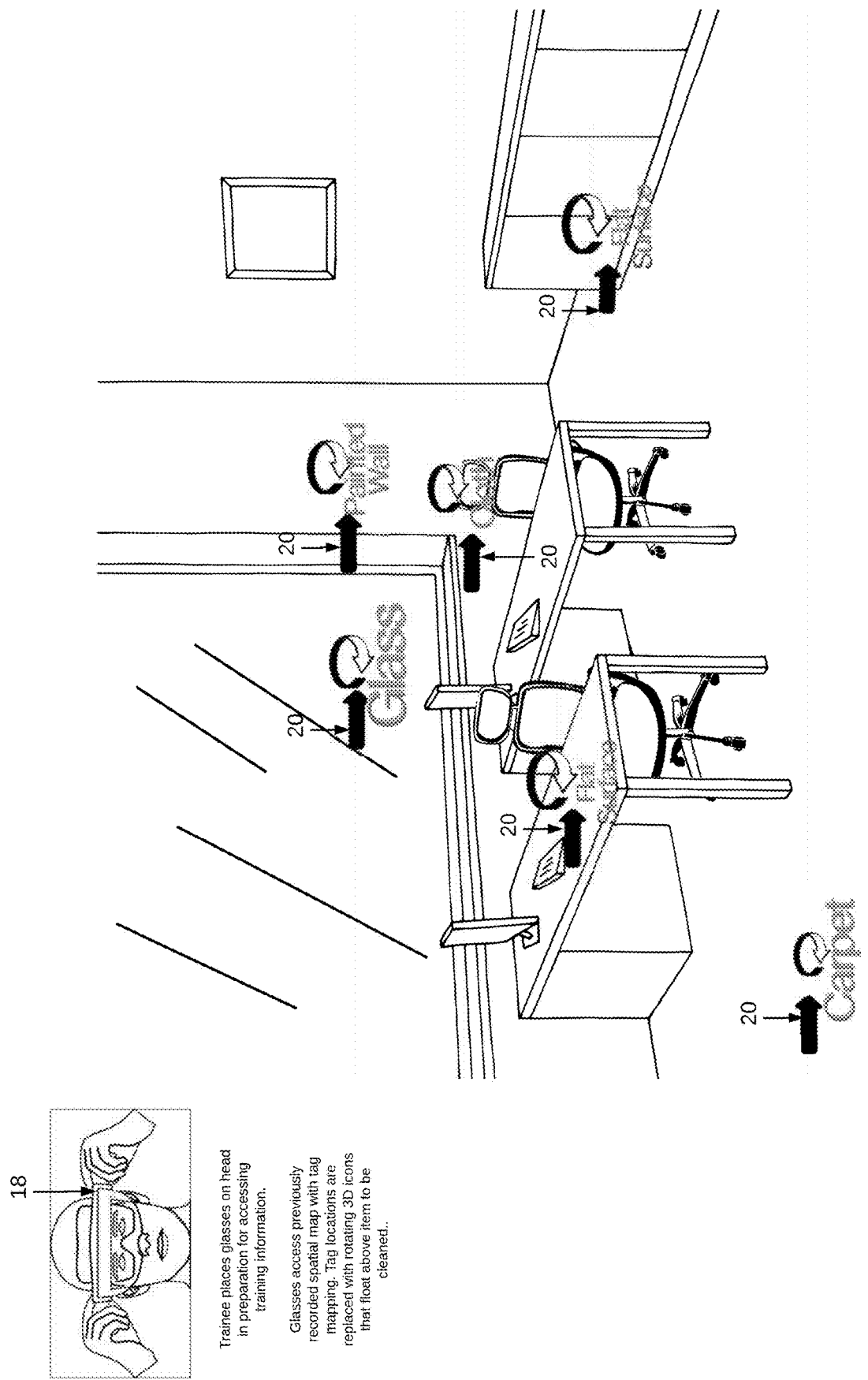
Figure 4:
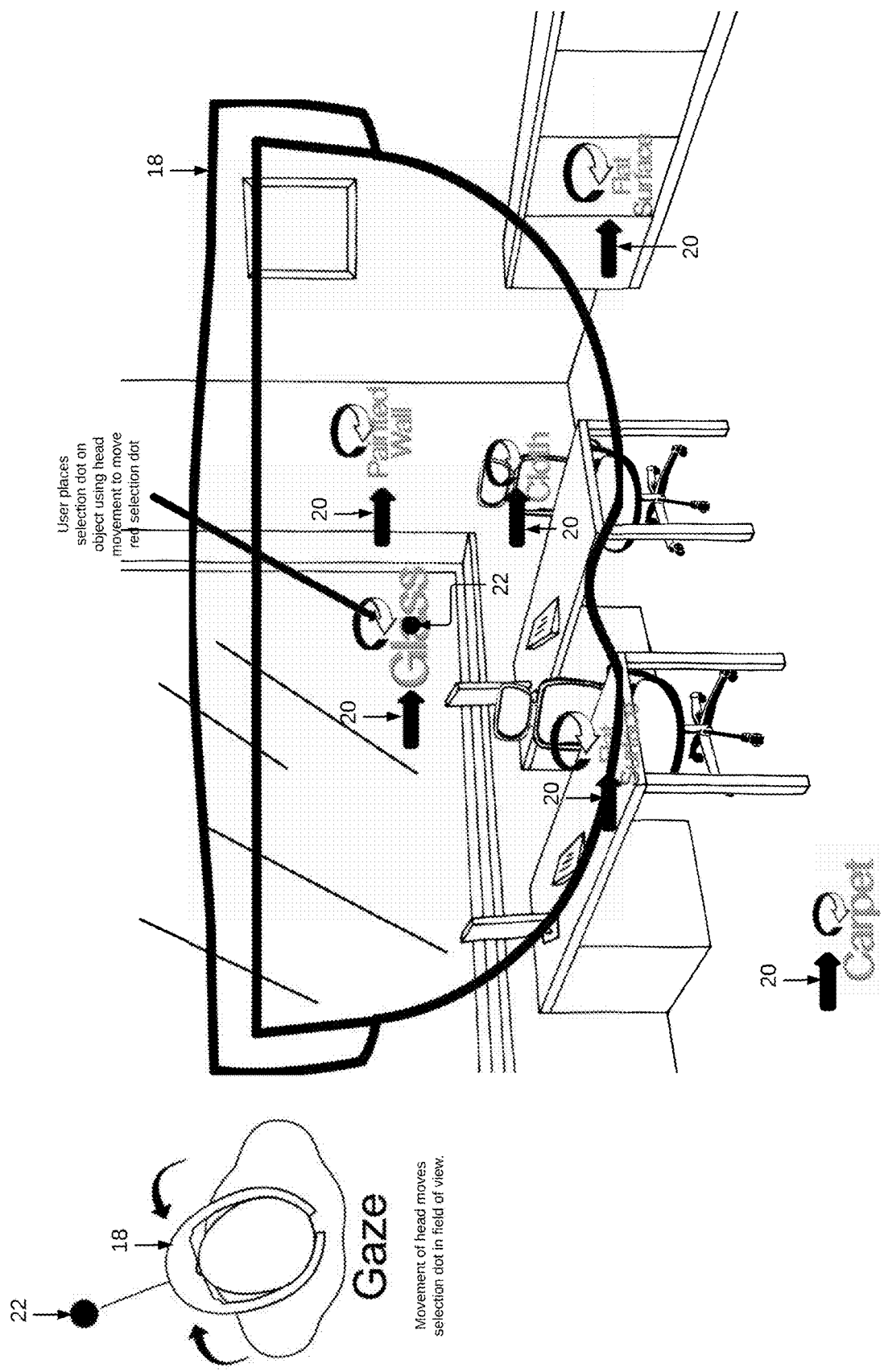

Next, as shown in FIG. 2, the trainer will remove the reader 18, and also remove the tags 16 from the locations 14 in the room 12 as indicated by the arrows. Following this, as shown in FIG. 3, a trainee will don the reader 18 as prepared by the trainer with the spatial map of the room 12 having the information of the tags 16. Next, as seen in FIG. 4, the trainee will scan the room 12 as by moving or looking about the room 12. As shown, the locations of the tags 16 are viewed by the trainee as the rotating 3-dimensional icons 20 above each of the locations 14. The reader 18 also displays a selection dot 22 or other selector which the trainee may direct by head movement to a desired one of the icons 20. In this case, the trainee has located the selection dot 22 on the icon 20 for a glass surface of the room 12.

Figure 5:
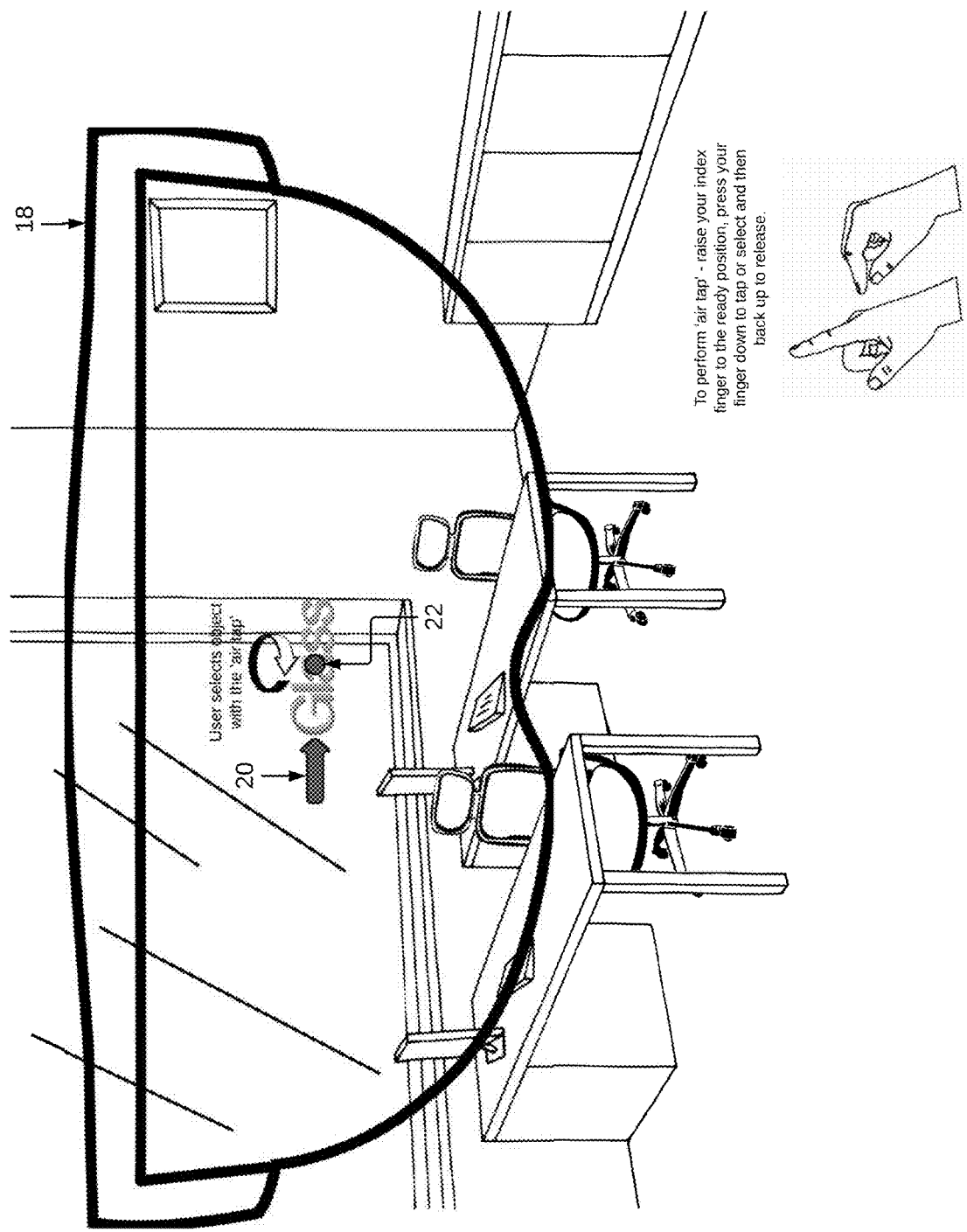

Next, as shown in FIG. 5, the trainee may select the icon 20 for the glass surface by virtually clicking on the dot 22 as by performing an air tap gesture with their fingers. For example, the trainee may raise the index finger of a hand to a raised or ready position, then pressing the finger down to tap the dot 22 and select the desired icon 20, and then moving the finger up to release the dot 22. It will be appreciated that in performing an air tap gesture the dot 22 must be on the selected item, but that the air tap may be done anywhere in the field of view of the trainee.

Figure 6:
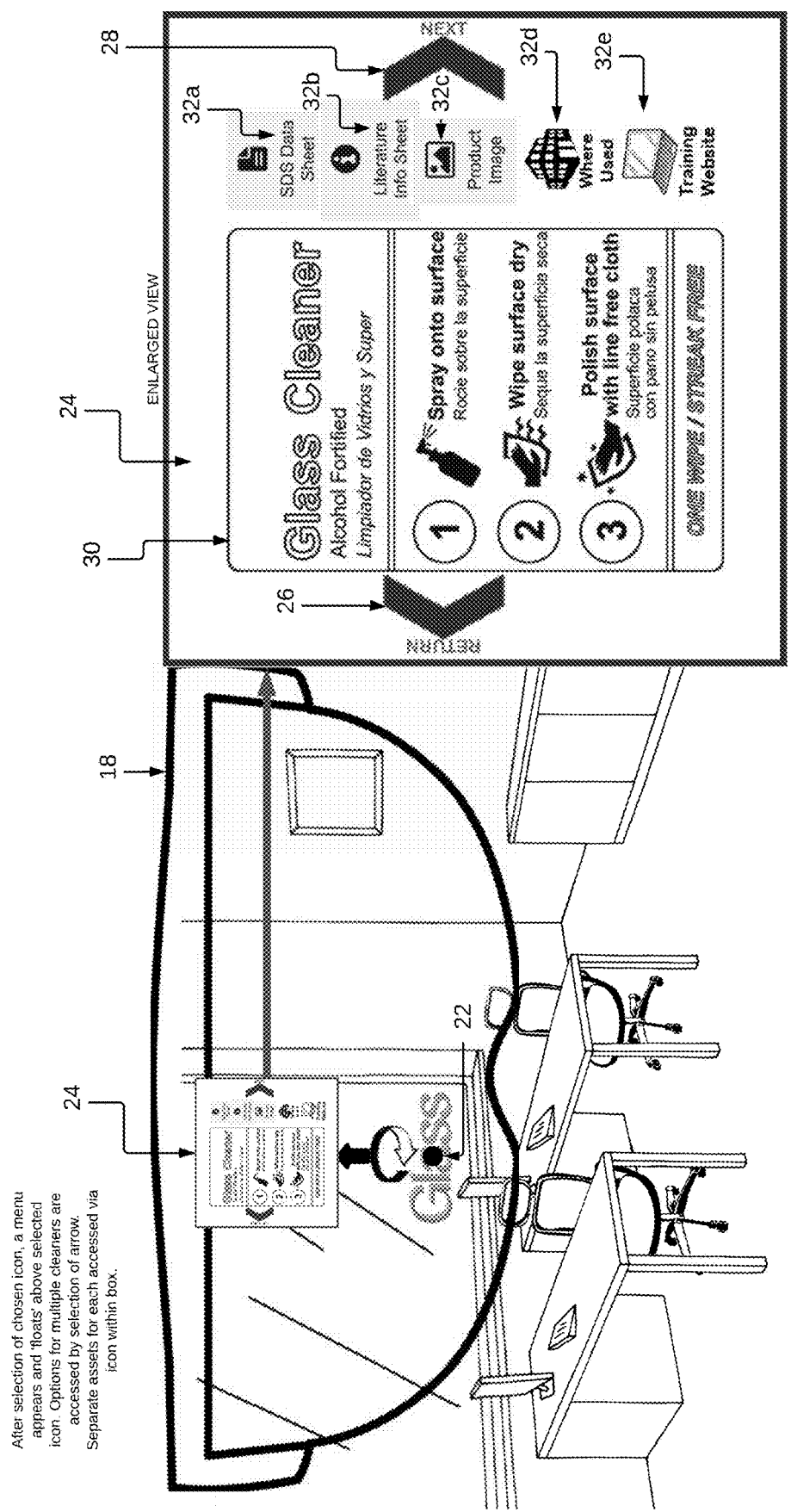

As shown in FIG. 6, after selection of the desired icon 20 a menu 24 appears to the trainee in the field of view of the reader 18 adjacent to or above the desired icon 20. The menu 24 includes information about one or more of the pre-selected cleaning or janitorial products for the location 14 corresponding to the selected icon 20. The trainee can exit the menu and return to the previous view as by interacting with a return arrow 26 as by a finger tap.

Figure 7:
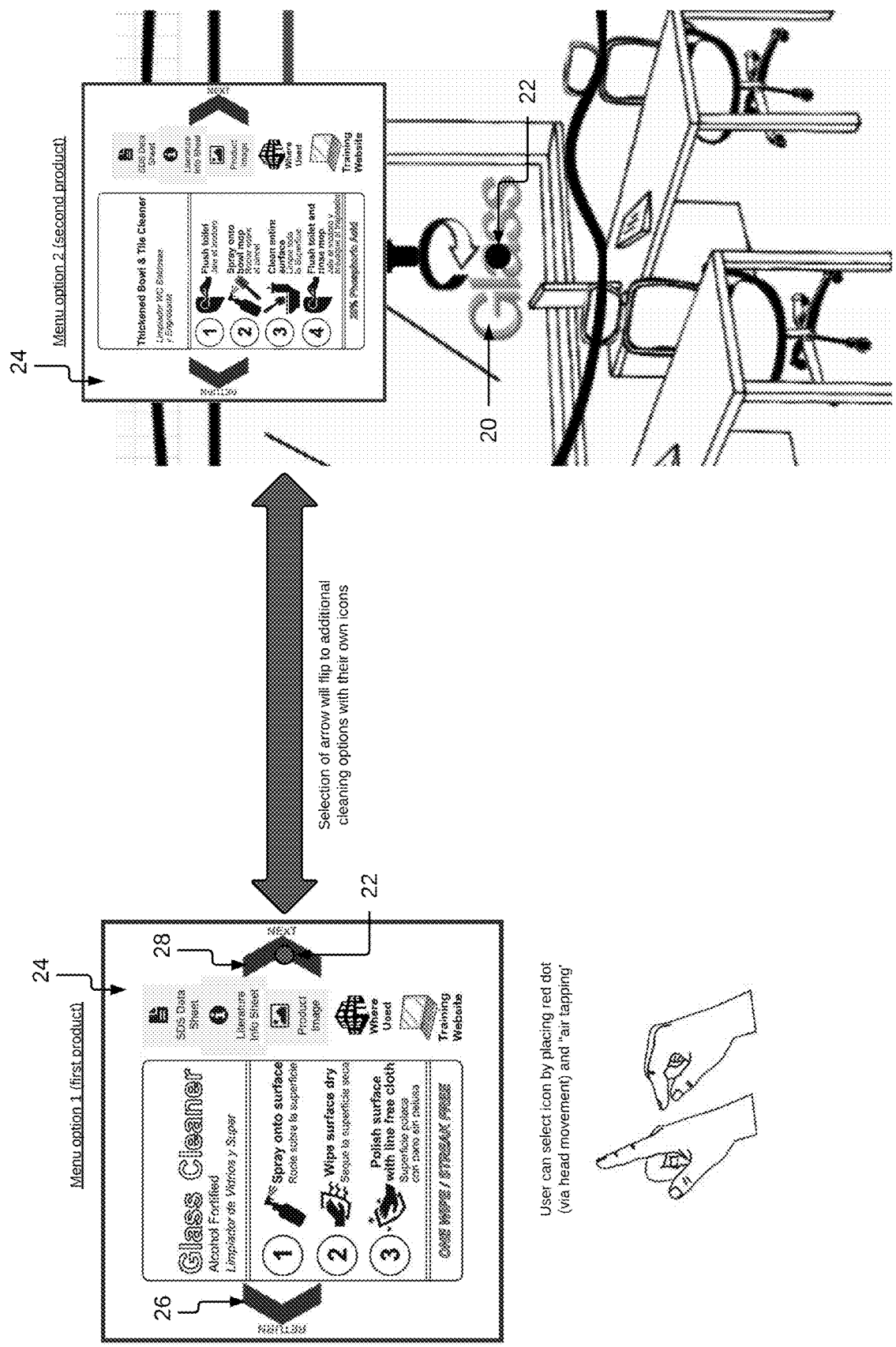
Figure 8:
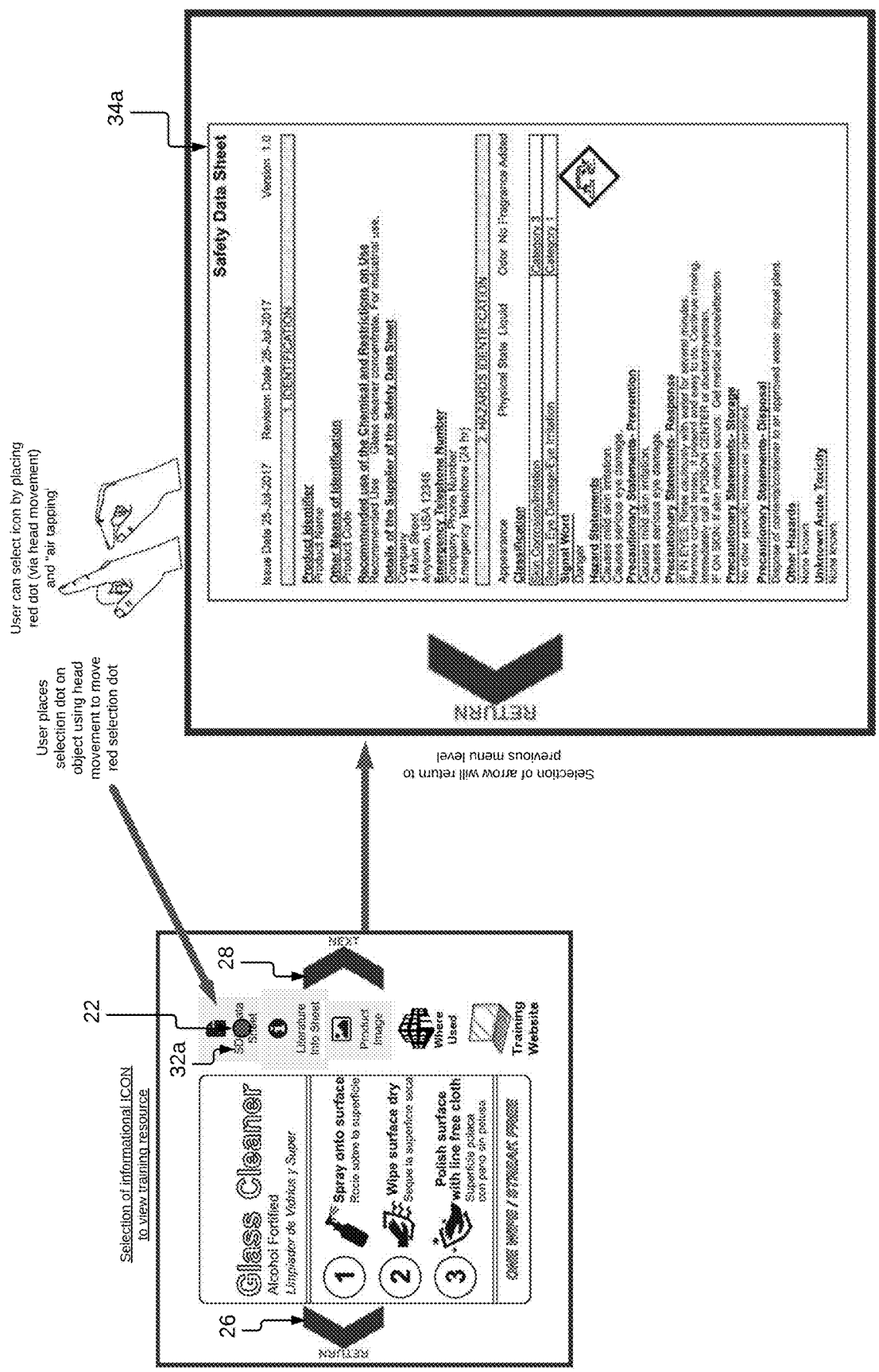
Figure 9:
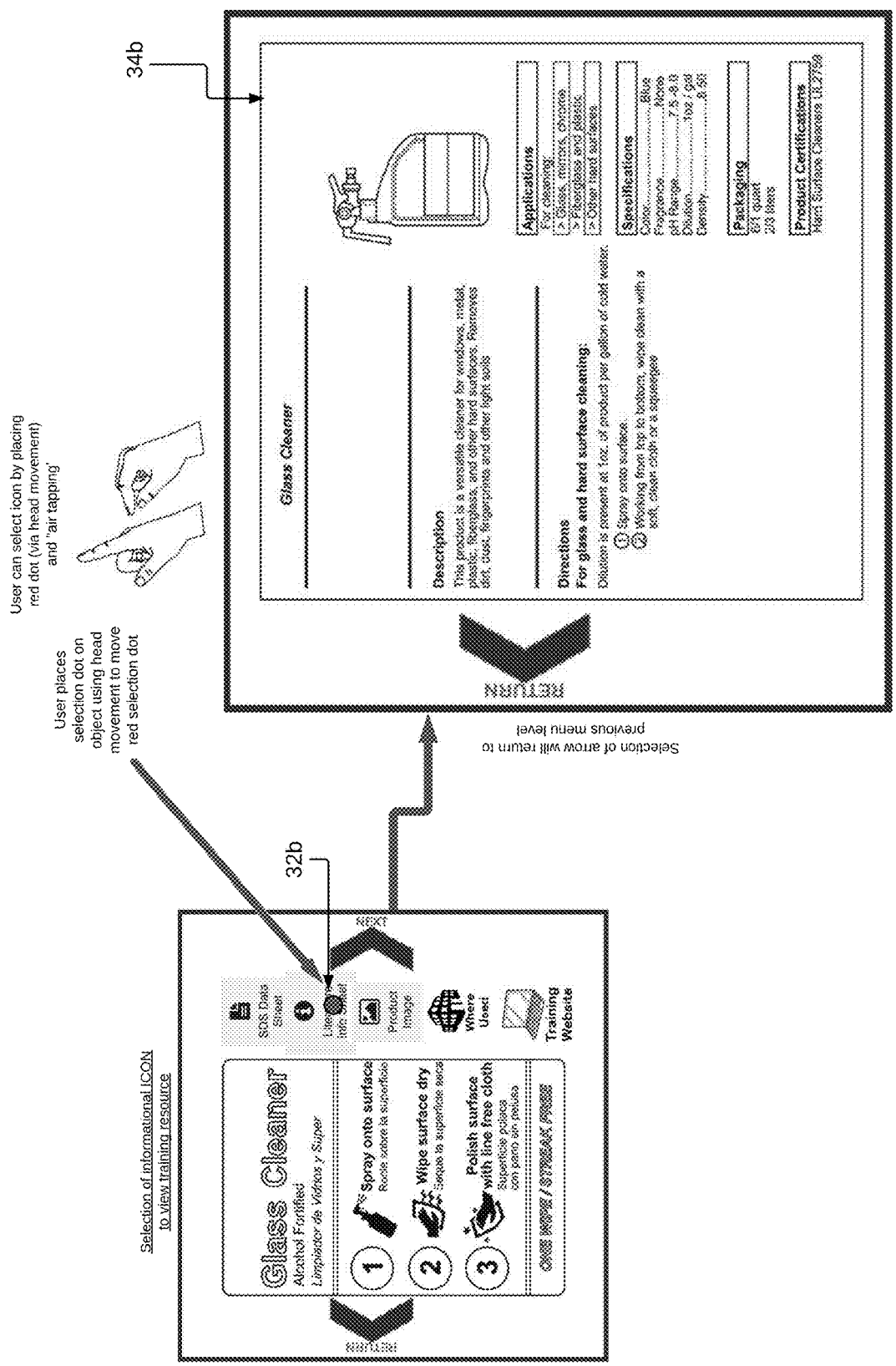
Figure 10:
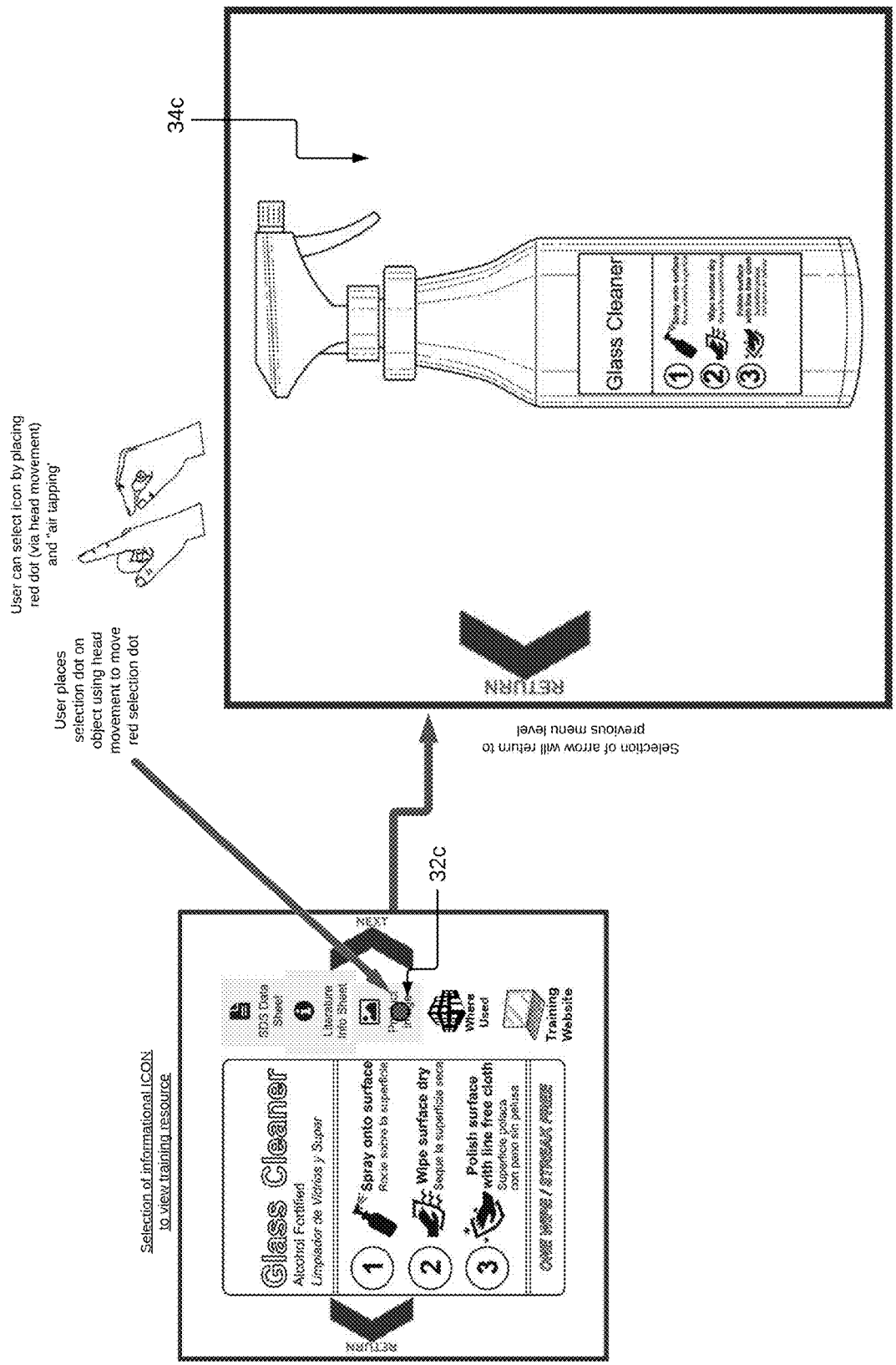
Figure 11:
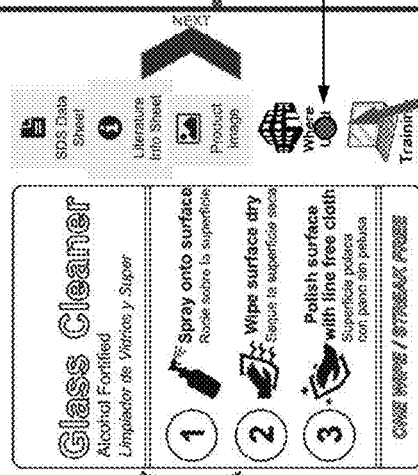

With additional reference to FIG. 7, each cleaning or janitorial product desirably has its own page of the menu. If more than one product is indicated for the location, a next arrow 28 for each page will also be visible and the trainee can cycle between the pages for the different cleaning or janitorial products by interacting with the arrows 26 and 28 as by a finger tap. The arrow 26 moves the view back one step and the arrow 28 moves the view forward one step to the next product, if present.

The menu 24 for each of the janitorial and cleaning products preferably includes an image 30 corresponding to the label of the product, and icons 32a, 32b, 32c, 32d, and 32e that when selected link to a website having support materials for the selected janitorial or cleaning product.

Figure 12:
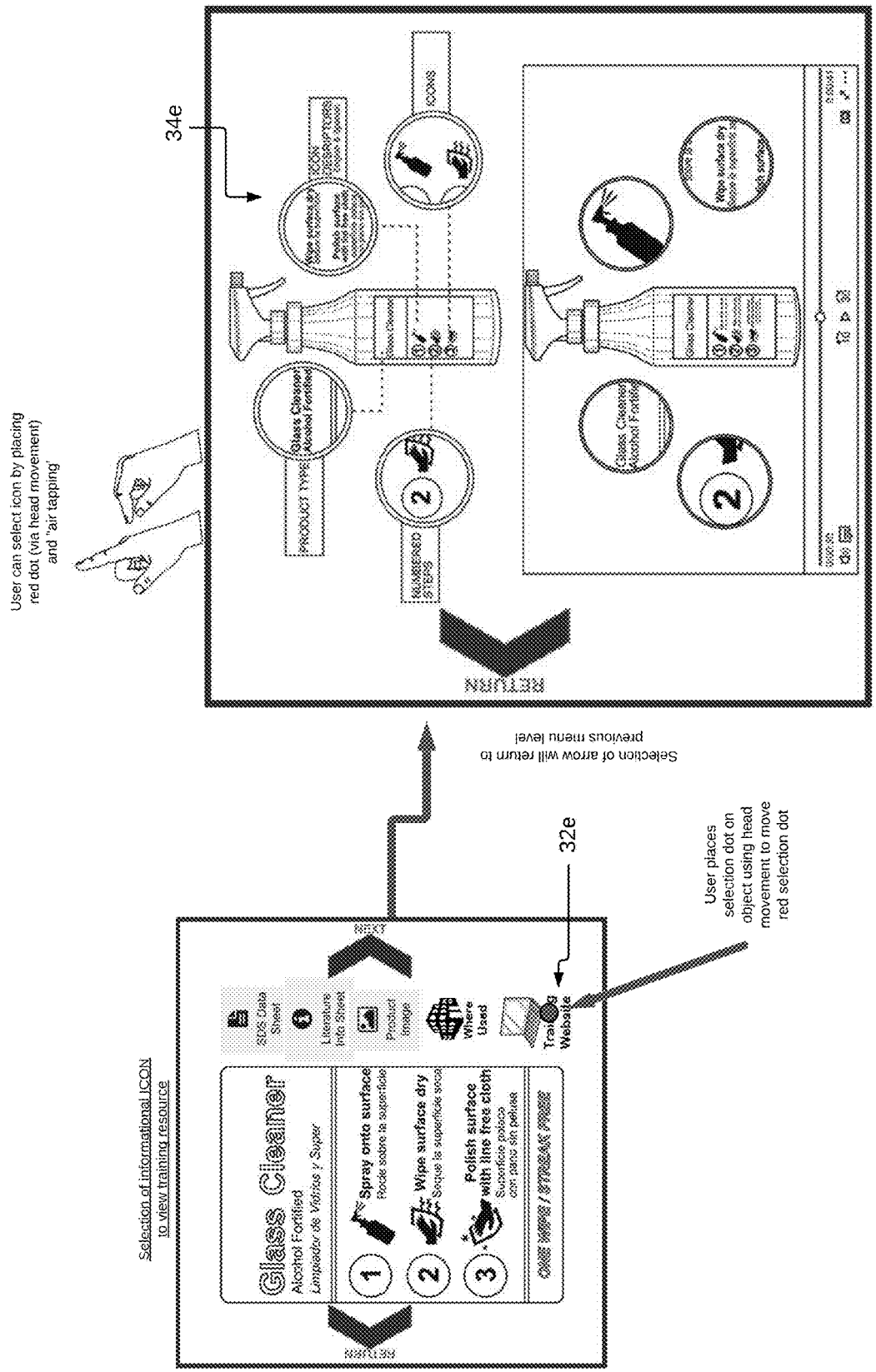
Figure 13:
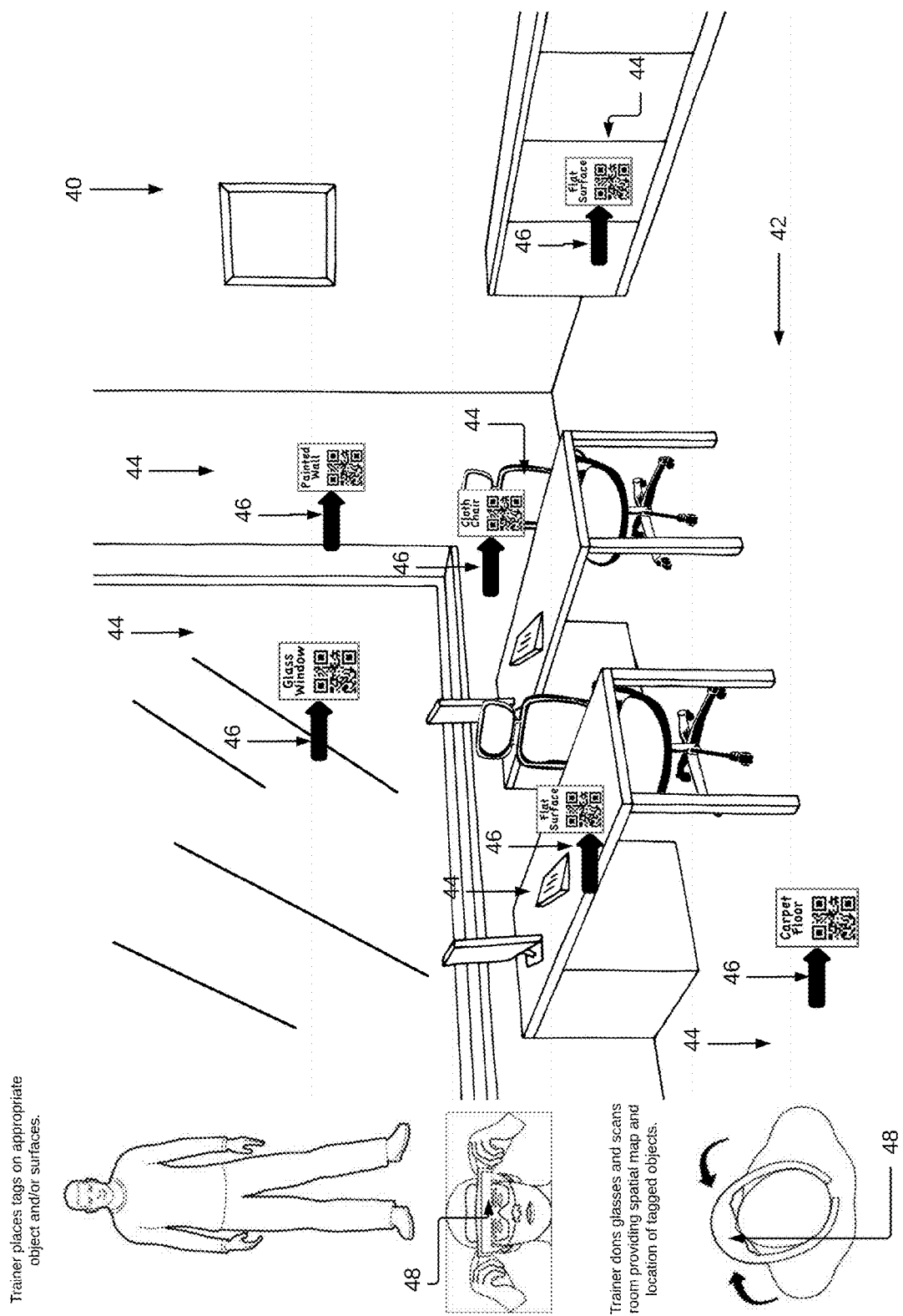
FIGS. 13-23 show aspects of a training system and method according to another embodiment of the disclosure.

For example, the icon 32a links to a safety data sheet 34a for the product (FIG. 8), the icon 32b links to a product literature 34b such as a description of the product and instructions for use of the product (FIG. 9), the icon 32c links to an image 34c in the form of a photo of the product (FIG. 10), the icon 32d links to description 34d of where to use the product (FIG. 11), and the icon 32e links to product brochures and videos 34e for the product (FIG. 12). The trainee may select amongst the icons 32a-32e and move between the associated support and training materials using the arrows 26 and 28 as by use of the selection dot 22 and finger taps.

With reference now to FIGS. 13-23 there is shown a training system 40 for training and guiding persons in the use of janitorial and cleaning products according to the disclosure. The system 40 has been observed to facilitate training and guiding cleaning in the use of a wide variety of janitorial and cleaning products for a variety of facilities.

In overview, the system 40 includes a room 42 having a variety of locations 44 to be cleaned. Initially, each of the locations 44 is provided with an optical tag 46 that is readable by a reader 48. For example, a trainer conducting a training session for a trainee will place the optical tags 46 at the locations 44. The room 42, locations 44, tags 46, and reader 48 substantially correspond to the room 12, locations 14, tags 16, and reader 18 described above in connection with FIGS. 1-12.

Figure 15:
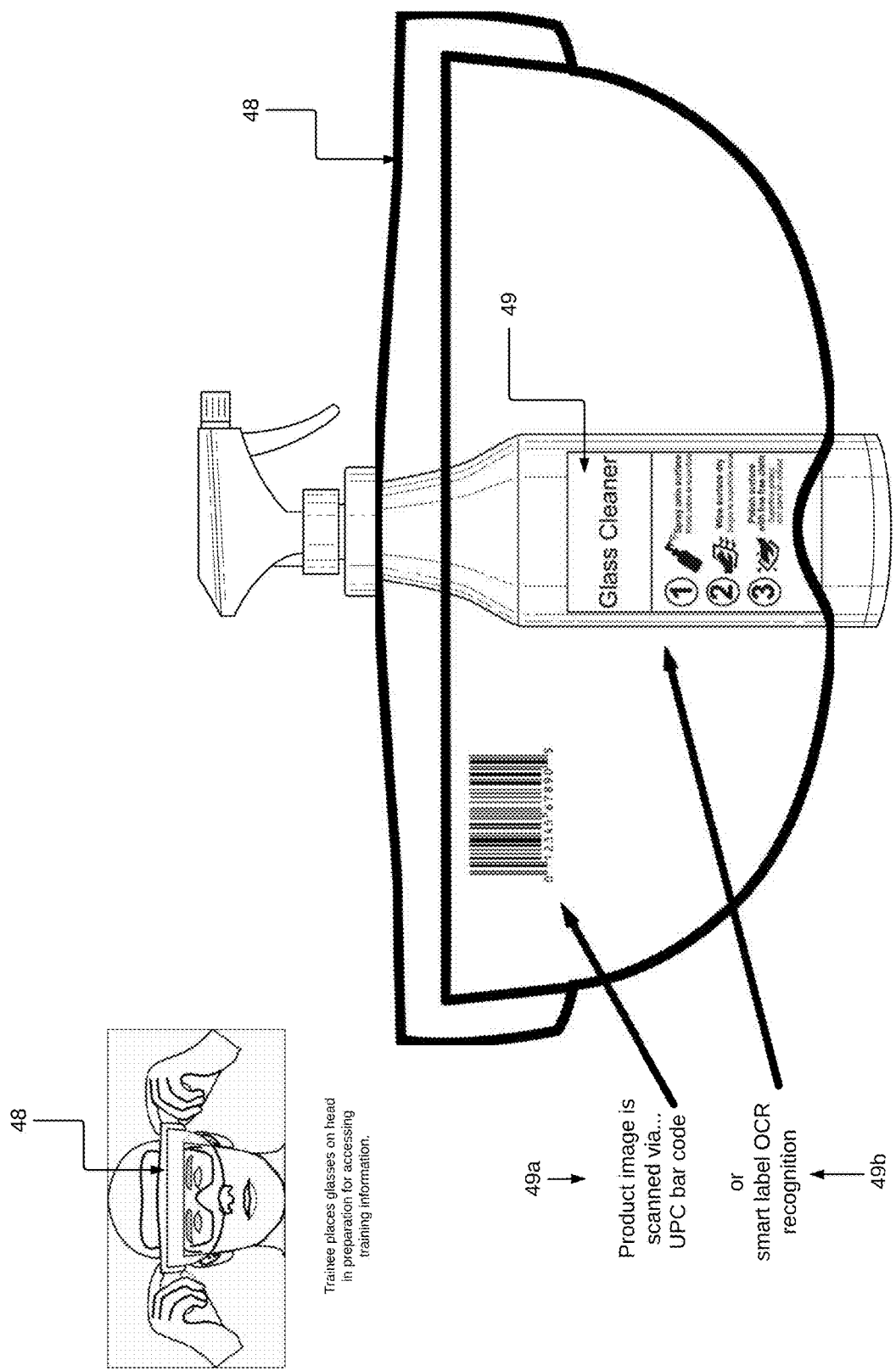

The system 40 differs from the system 10 in that initially a trainee uses the reader 48 to first interact with labels 49 associated with the pre-selected janitorial and cleaning products, as seen in FIG. 15. The labels 49 are readable by the reader 48 and may contain a barcode 49a and/or optical character recognition indicia 49b. The reader 48 and the optical tags 46 are initially used in the same manner as described previously to create a spatial map of the room 42, but instead of the trainee then entering the room 42, the trainee first interacts with the labels 49 of the products using the reader 48 to view before entering the room 42.

Returning now to FIG. 13 in use of the system 40 to train a trainee in cleaning of the room 42 using the pre-selected janitorial and cleaning products having the labels 49, a trainer will initially place the tags 46 at the desired locations 44 within the room 42.

Figure 22:
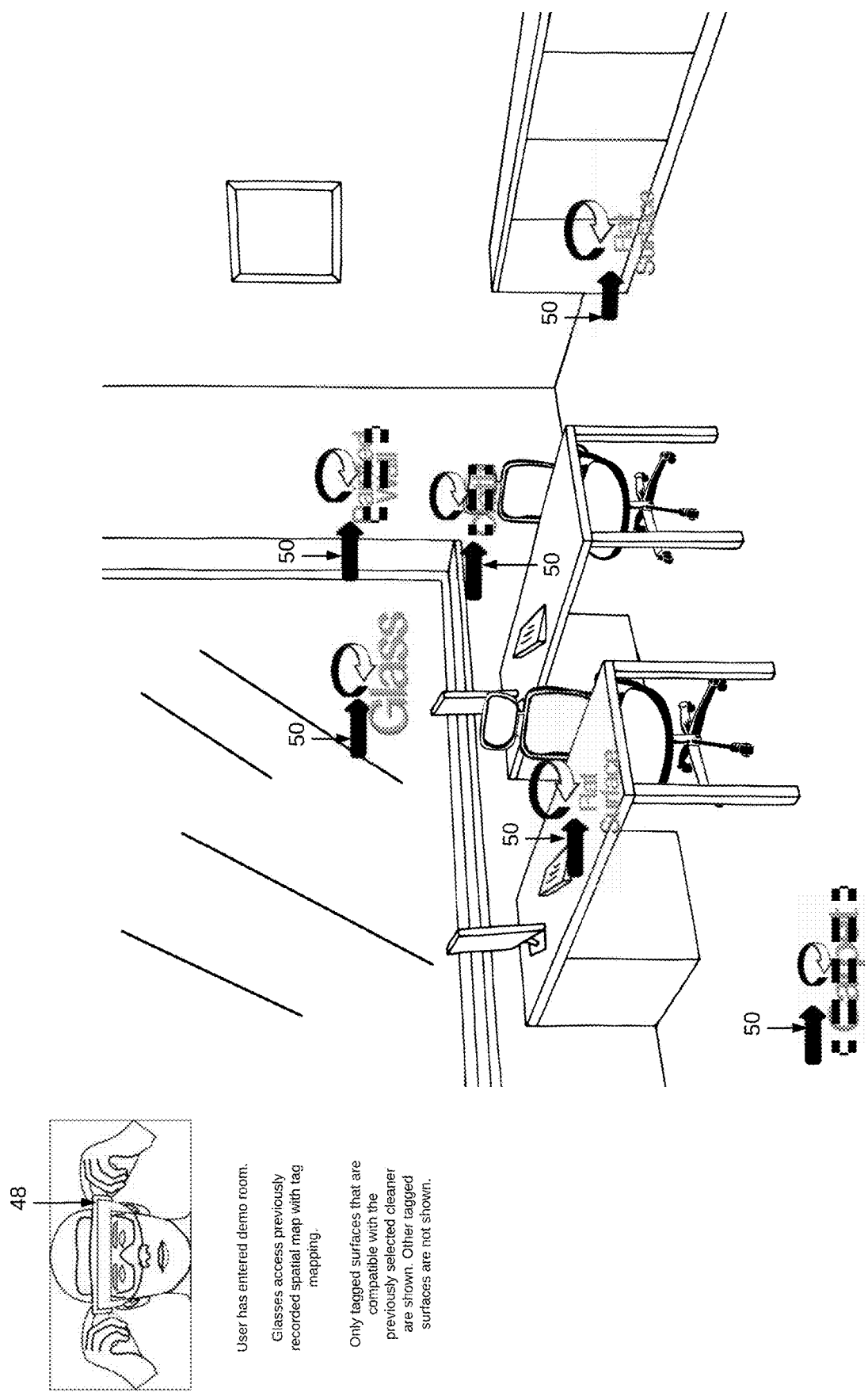
Figure 23:
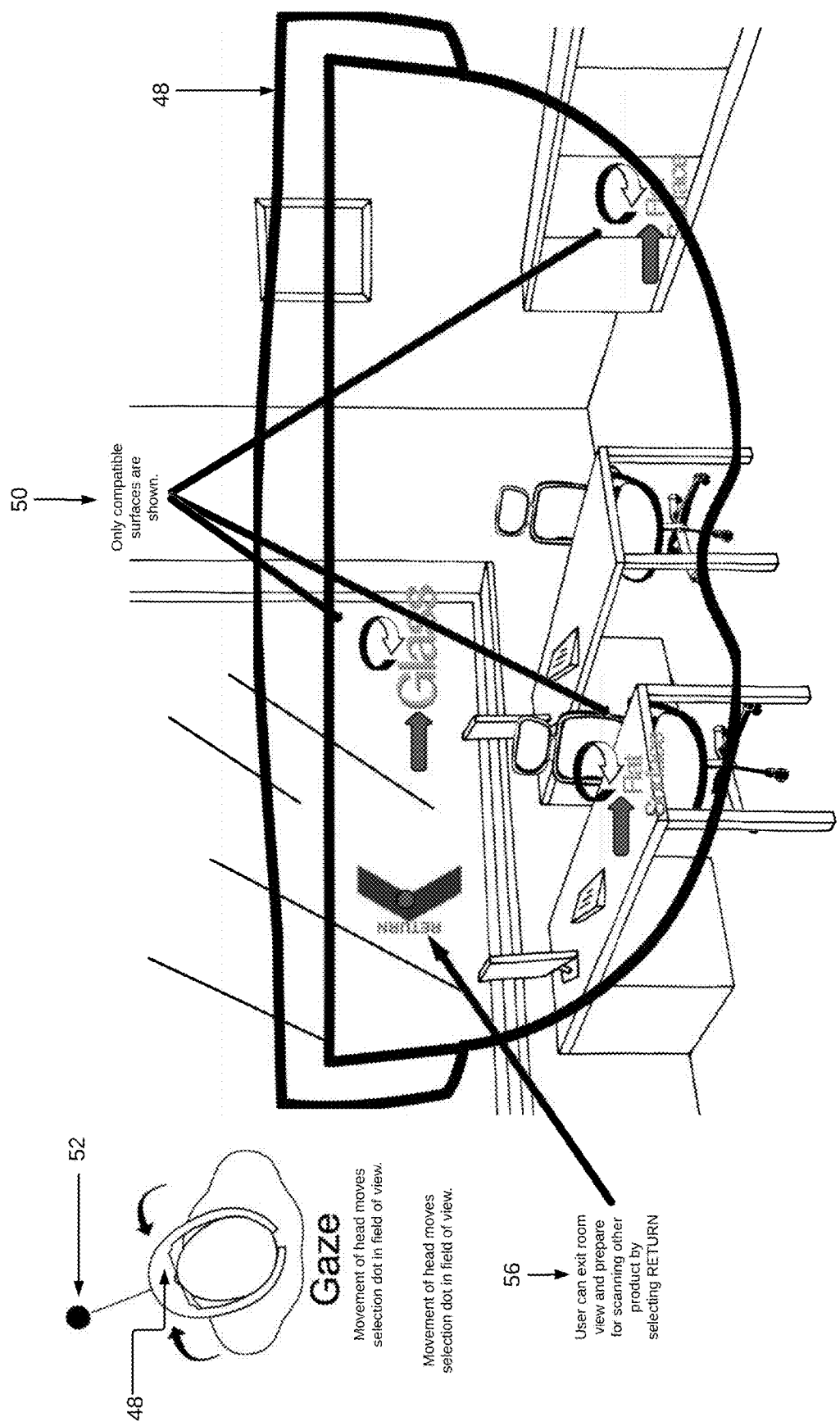

Next, the trainer will don the reader 48 and scan the room 42 as by moving or looking about the room 42 to enable the reader 48 to detect the optical tags 46. In this regard, the reader 48 is programmed to generate a spatial or three-dimensional map of the room 42 with the location of the tags 46 represented by rotating 3-dimensional icons 50 or other indicium or indicia above or adjacent each of the locations 44, as shown in FIGS. 22 and 23.

Figure 14:
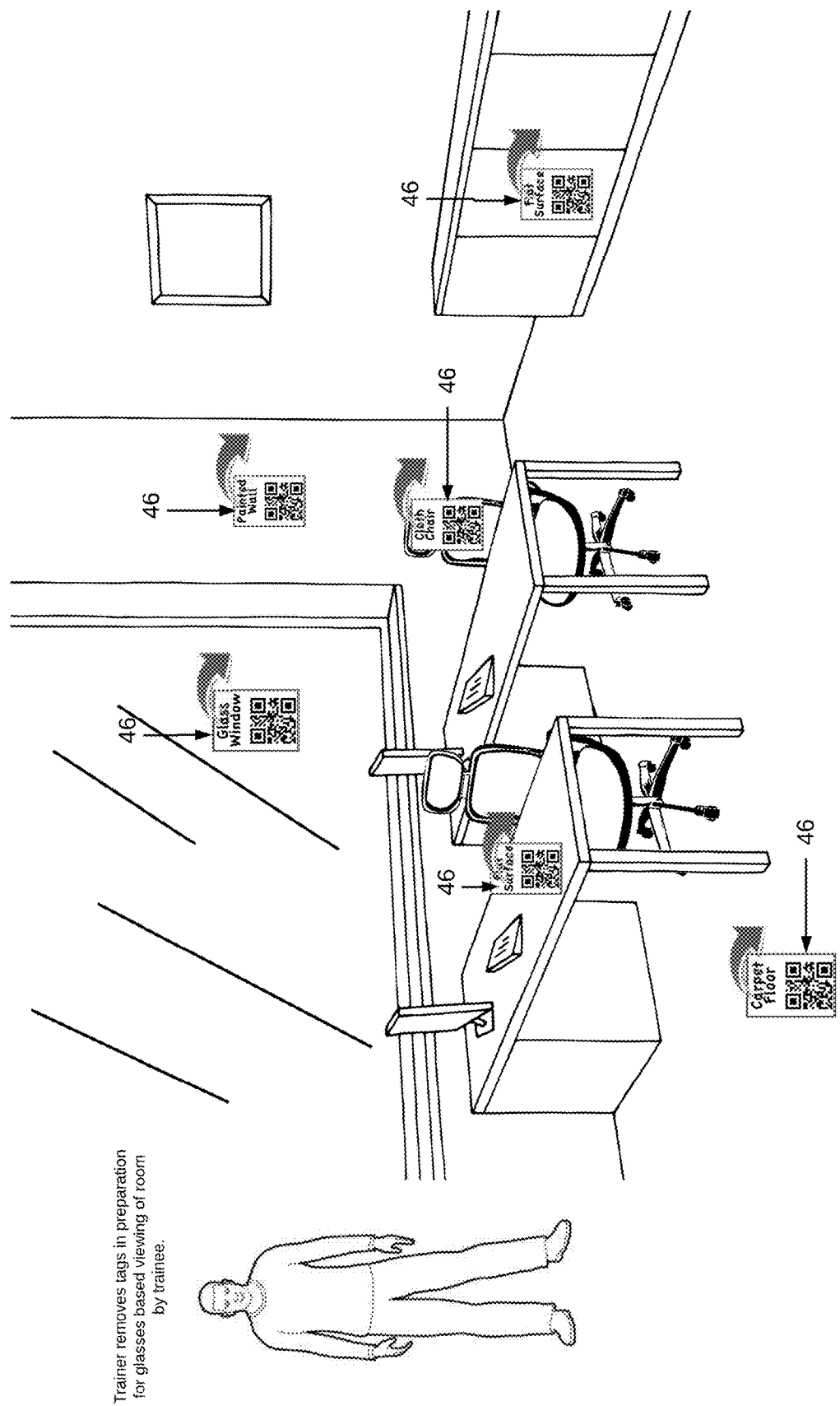

Next, as shown in FIG. 14, the trainer will remove the reader 48, and also remove the tags 46 from the locations 44 in the room 42 as indicated by the arrows. Following this, as shown in FIG. 15, a trainee will don the reader 48 as prepared by the trainer with the spatial map of the room 42 having the information of the tags 46. However, instead of initially entering the room 42, the trainee will select one of the pre-selected janitorial and cleaning products and use the reader 48 to view the barcode 49*a* and/or the optical character recognition indicia 49*b*.

Figure 16:
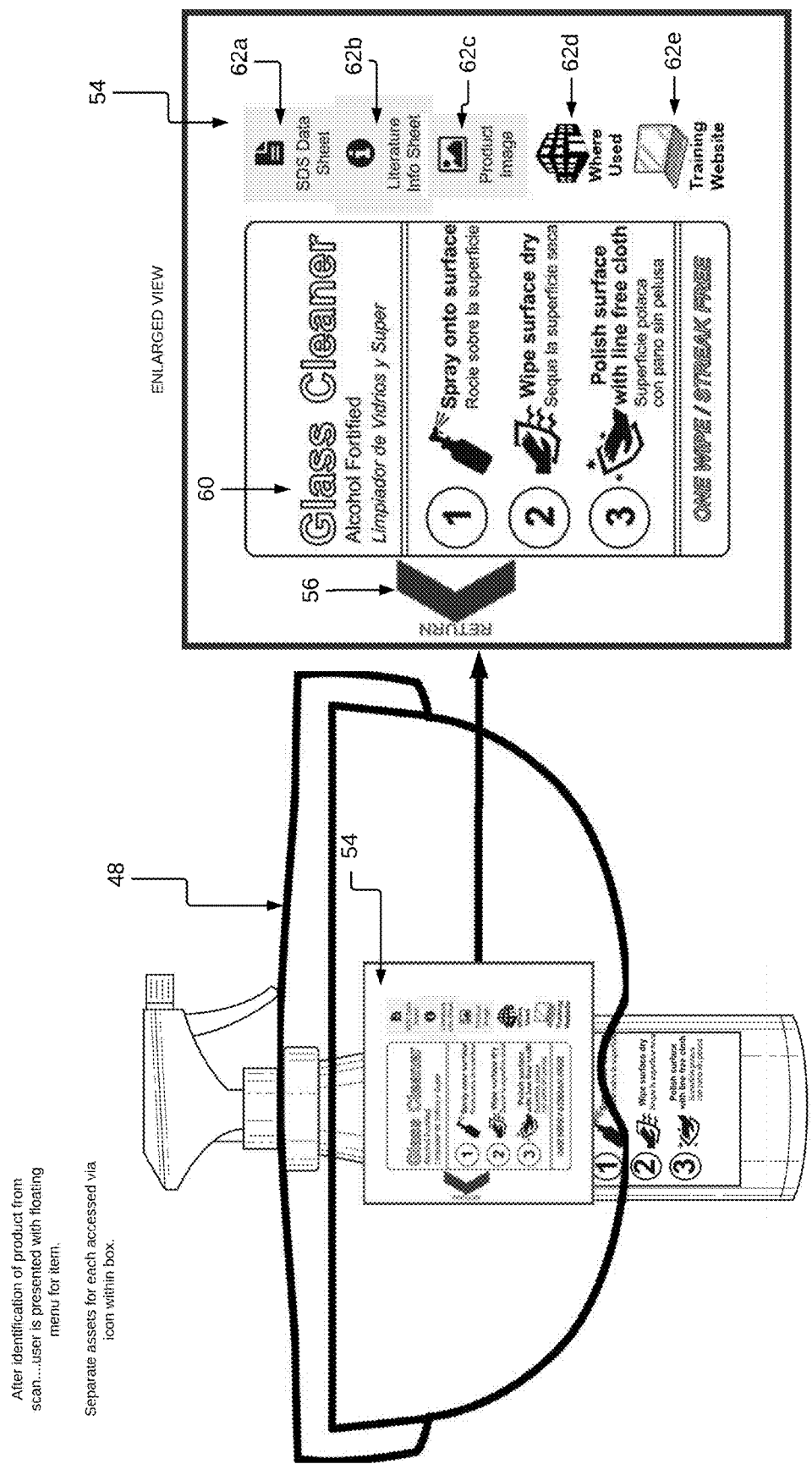
Figure 17:
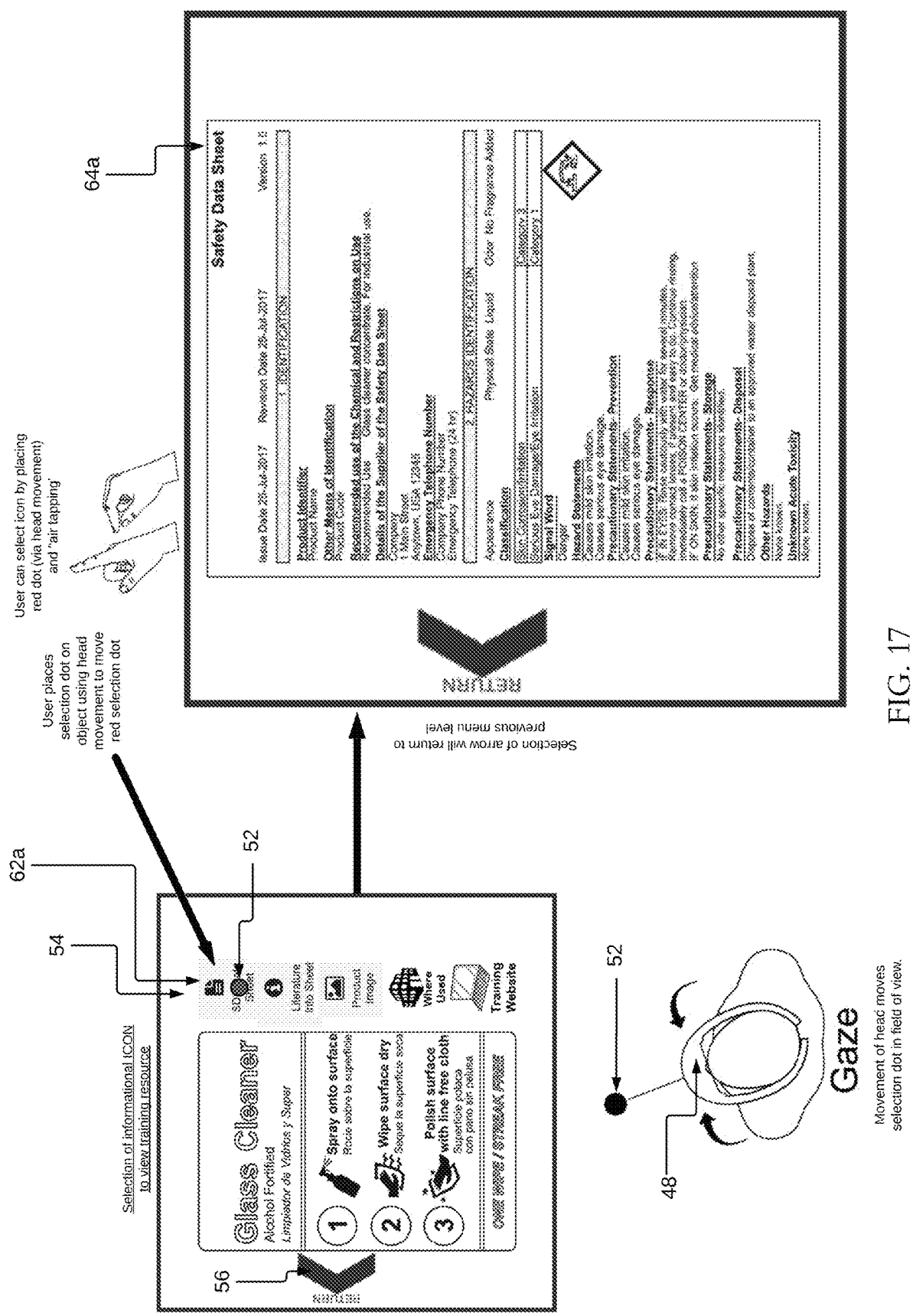
Figure 18:
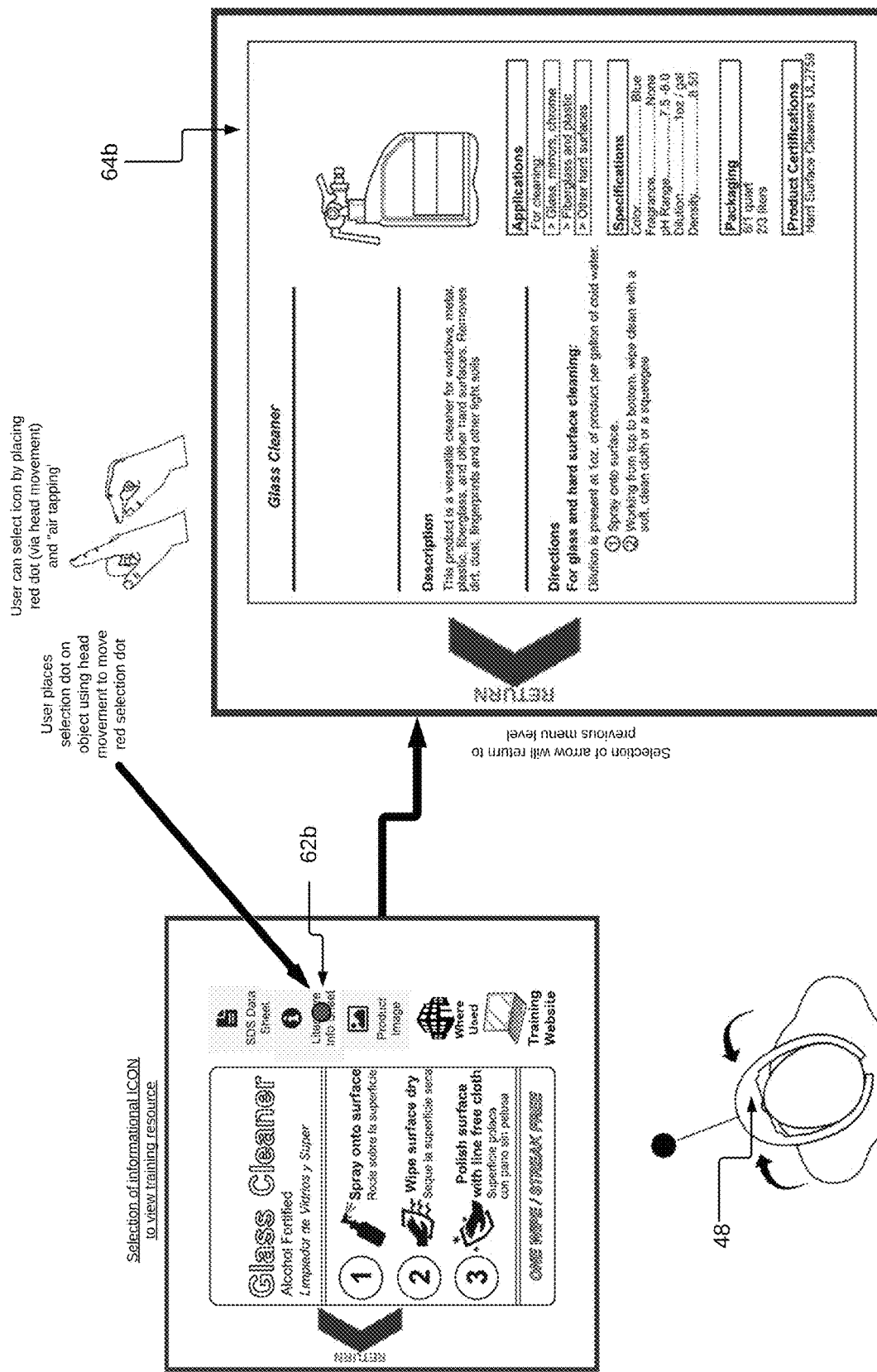
Figure 19:
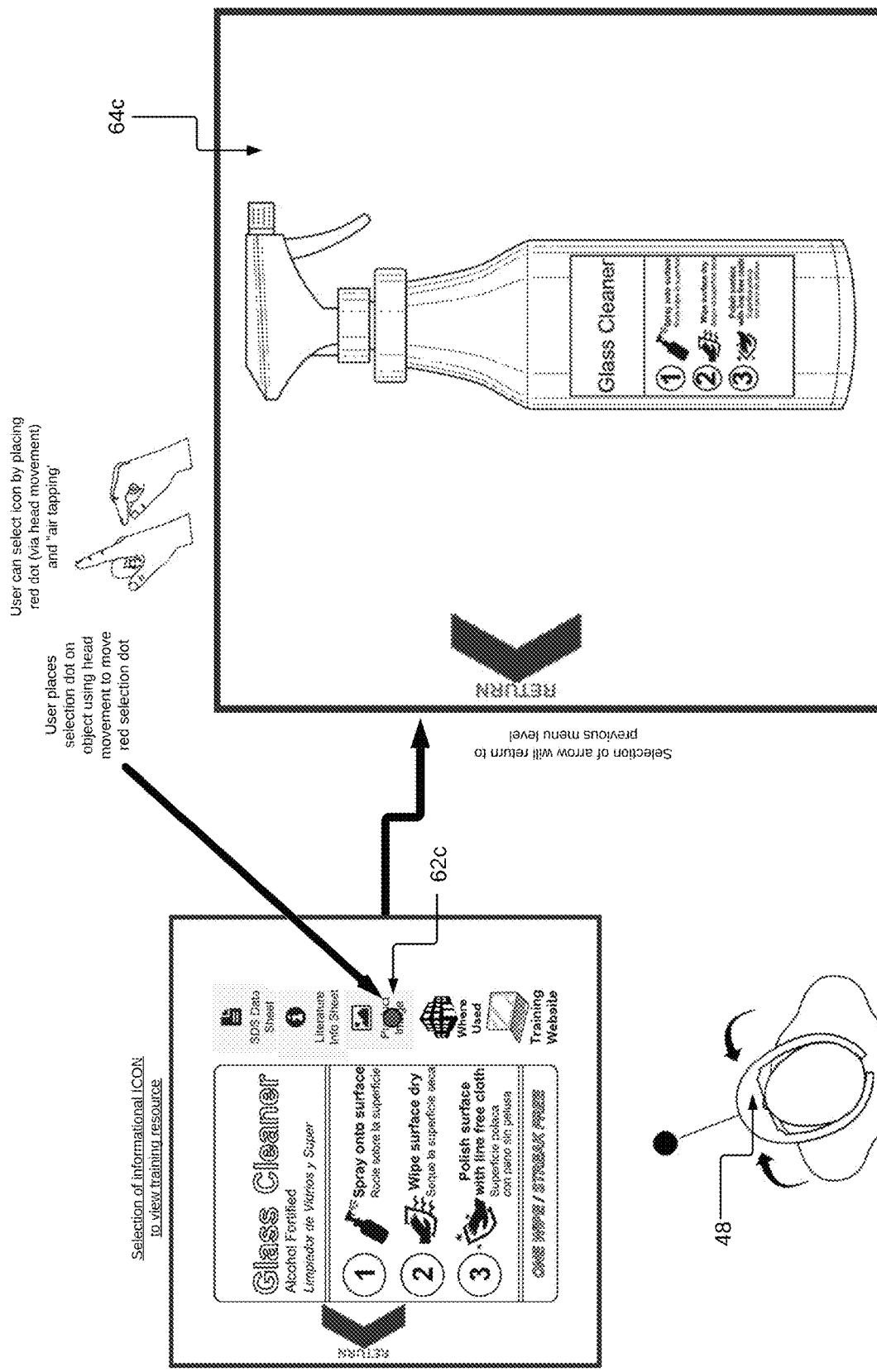

The reader 48 also displays a selection dot 52 or other selector which the trainee may direct by head movement as the trainee views a menu 54 that appears to the trainee in the field of view of the reader 48 as a result of viewing the product label 49 with the reader 48, as shown in FIGS. 16 and 17.

The menu 54 includes information about the pre-selected cleaning or janitorial product associated with the label 49 viewed by the trainee using the reader 48. The trainee can exit the menu 54 and return to the previous view as by interacting with a return arrow 56 as by a finger tap. The menu 54 includes an image 60 corresponding to the label 49 of the product, and icons 62*a*, 62*b*, 62*c*, and 62*e*, that when selected link to a website having support materials for the selected janitorial or cleaning product. An icon 62*d* is selected, as explained more fully below, when the trainee is ready to enter the room 42 for additional training.

Figure 20:
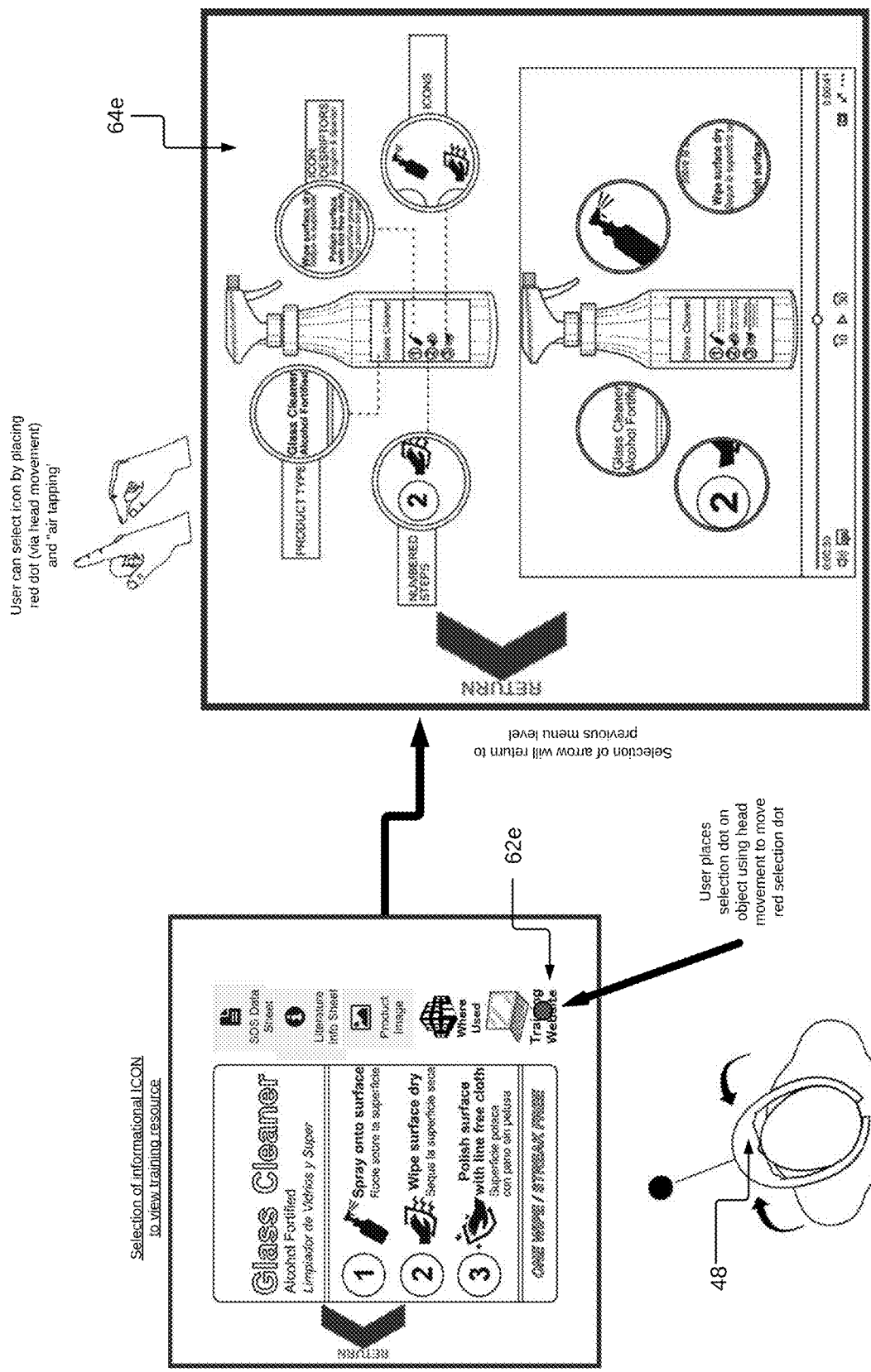

For example, the icon 62*a* links to a safety data sheet 64*a* for the product (FIG. 17), the icon 62*b* links to a product literature 64*b* such as a description of the product and instructions for use of the product (FIG. 18), the icon 62*c* links to an image 64*c* in the form of a photo of the product (FIG. 19), and the icon 62*e* links to product brochures and videos 64*e* for the product (FIG. 20). The trainee may select amongst the icons 62*a*, 62*b*, 62*c*, and 62*e* and move between the associated support and training materials as by use of the selection dot 52 and finger taps.

Figure 21:
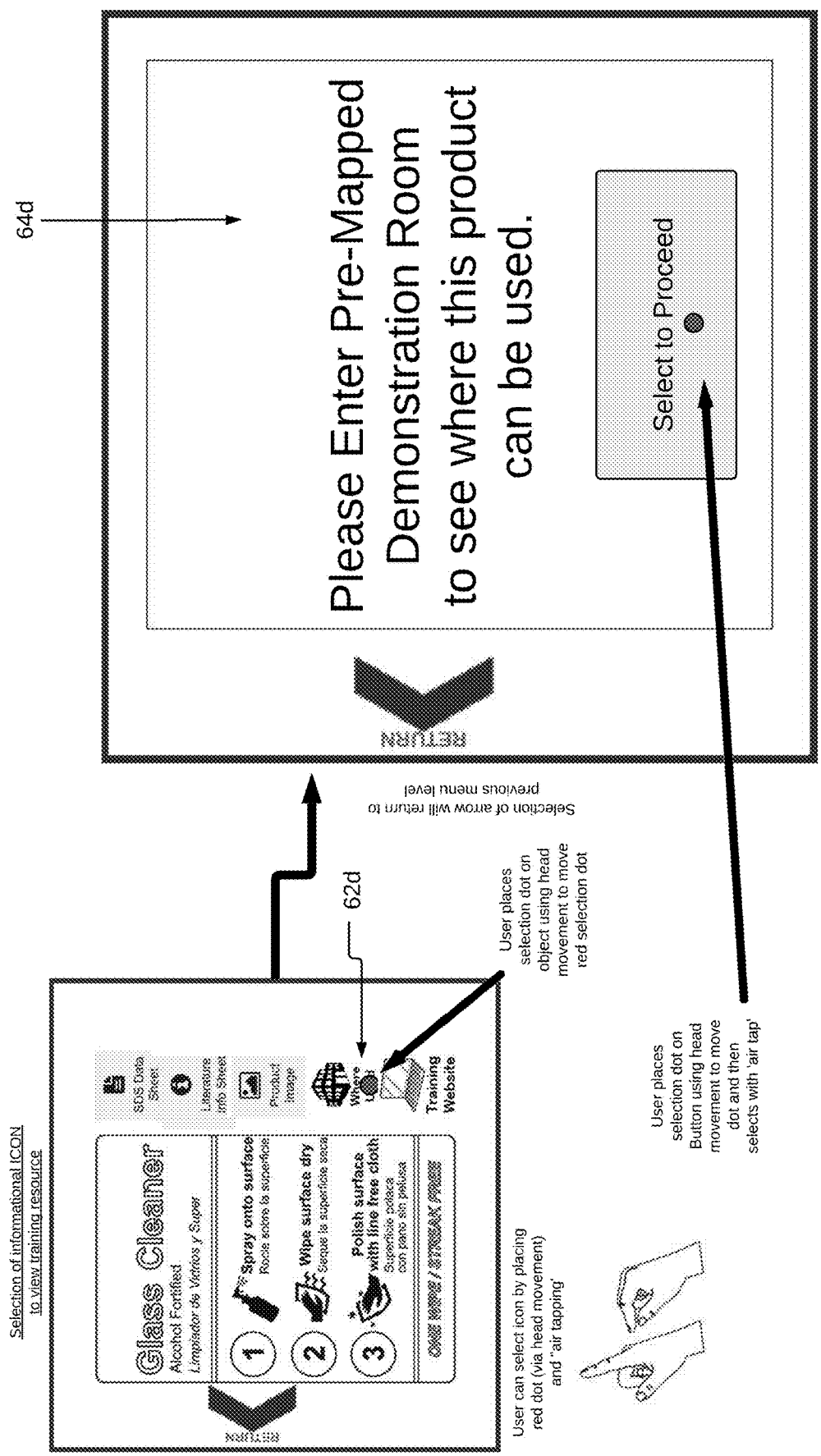

Next, following review by the trainee of the information of the selected product as outlined above, and with reference to FIG. 21, the trainee will select icon 62*d* from the menu 54 and will see an image 64*d* that enables the trainee to select to enter the room 42. Following this selection, and wearing the reader 48 as shown in FIGS. 22 and 23, the trainee will enter the room 42. As previously noted, the reader 48 has previously been programmed, as described above in connection with FIGS. 13 and 14, to generate a spatial map of the room 42 with the location of the tags 46 represented by rotating 3-dimensional icons 50 or other indicium or indicia above or adjacent each of the locations 44.

However, in this case, the only icons 50 that are visible to the trainee will be the icons 50 that represent the locations 44 that are to be cleaned using the cleaning or janitorial product associated with the label 49 that the trainee interacted with in the previous steps. The trainee may then interact with the displayed icons 50 in the manner described above in FIGS. 1-12 in connection with the trainee interacting with the icons 20.

The foregoing steps associated with FIGS. 15-23 may then be repeated for any additional cleaning or janitorial products, it being appreciated that any additional products will also have a label corresponding to the label 49 and that only the icons 50 associated with such product will be visible to the trainee when in the room as represented by FIG. 23.

In regard to the foregoing embodiments, and with additional reference to FIGS. 24-27, a reader 88 may be provided that can directly interface with each location 84 in a room 82 to be cleaned and thereby eliminate the need for the optical tags and the initial placement and removal of the optical tags. The reader 88 otherwise corresponds to the readers 18 and 48 and the locations 84 correspond to the locations 14 and 44.

The reader 88 is programmed to recognize the locations 84, e.g., recognize a glass surface, or a painted wall or a cloth surface or a carpeted surface, and the like, or at least the general nature of the surface, and use this surface recognition capability in place of the optical tags, and thereby link to a website of the type previously described having information about one or more pre-selected janitorial and cleaning products and the use thereof at the locations to be cleaned.

In the shown embodiment, a trainer will initially use the reader 88 to create a spatial map of the room 82. However, instead of there being optical tags in the room, the reader 88 is capable of recognizing the nature of the locations 84.

Figure 24:
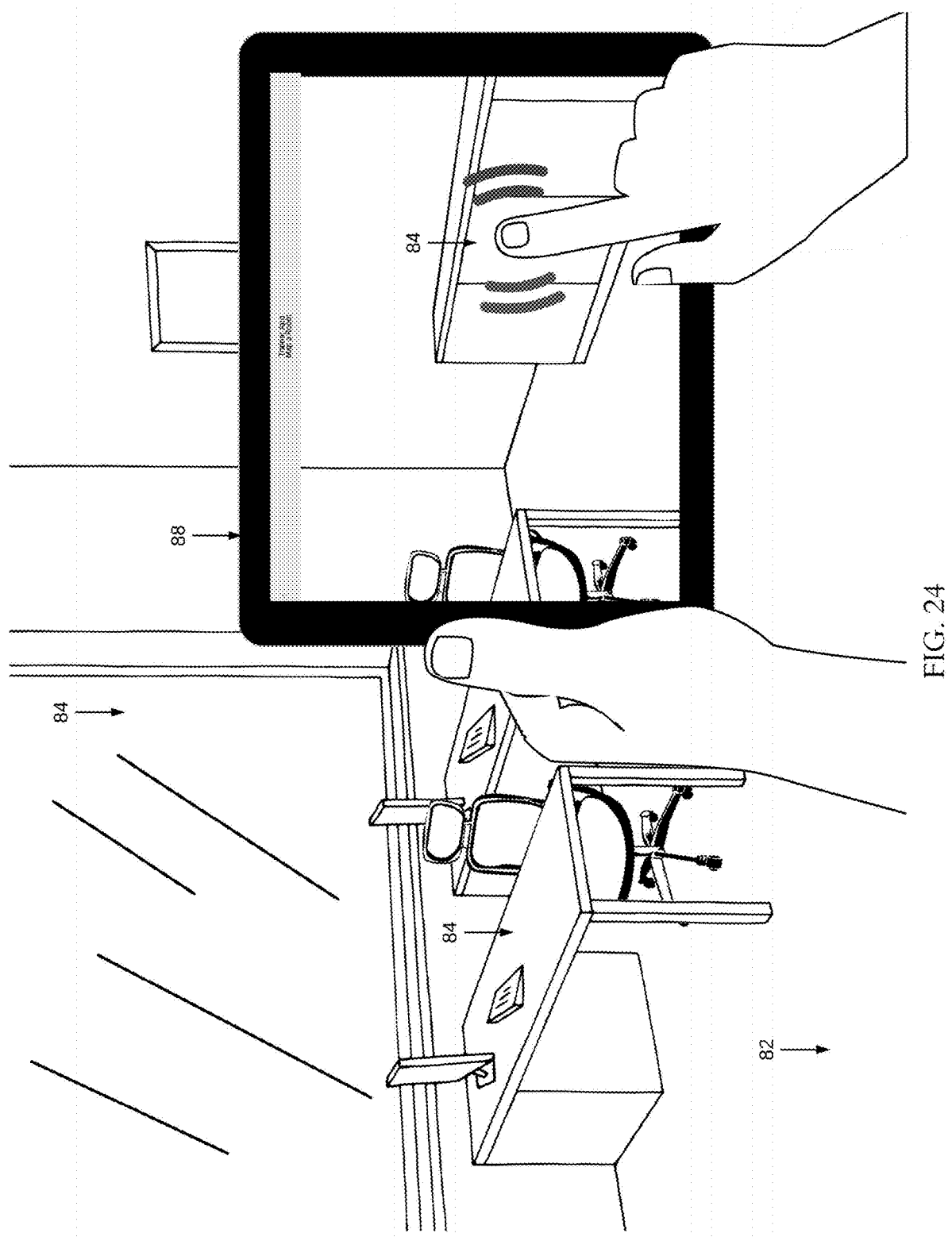
FIGS. 24-27 show aspects of a training system and method according to yet another embodiment of the disclosure.
Figure 25:
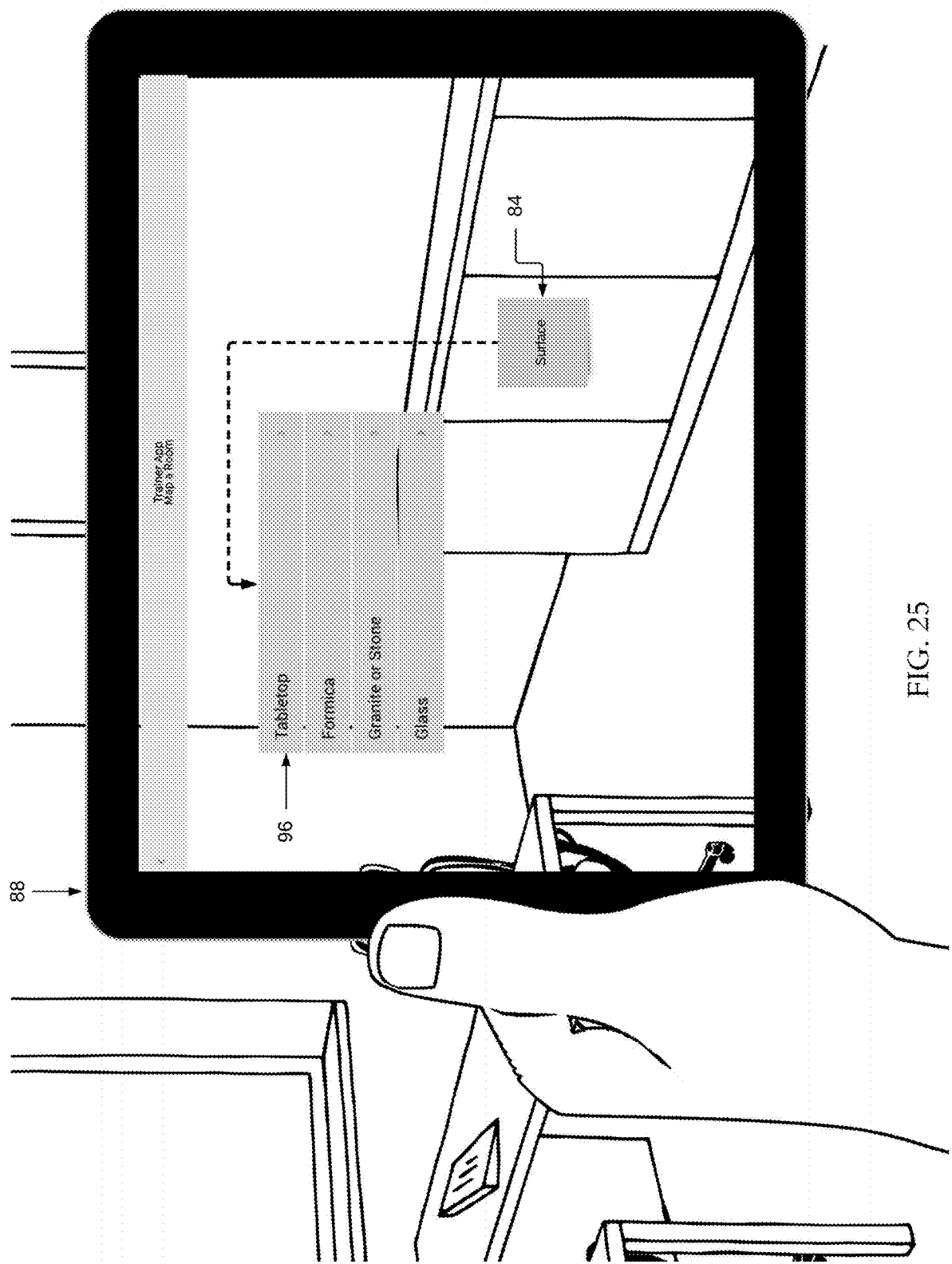

For example, as shown in FIG. 24, the trainer will orient the reader 88 onto one of the locations 84 and virtually click on the location 84 as by a finger tap on a viewing screen of the reader 88. Next, as shown in FIG. 25, the reader 88 will either recognize the specific surface or recognize a class of surfaces and present a menu 96 of surfaces.

Figure 26:
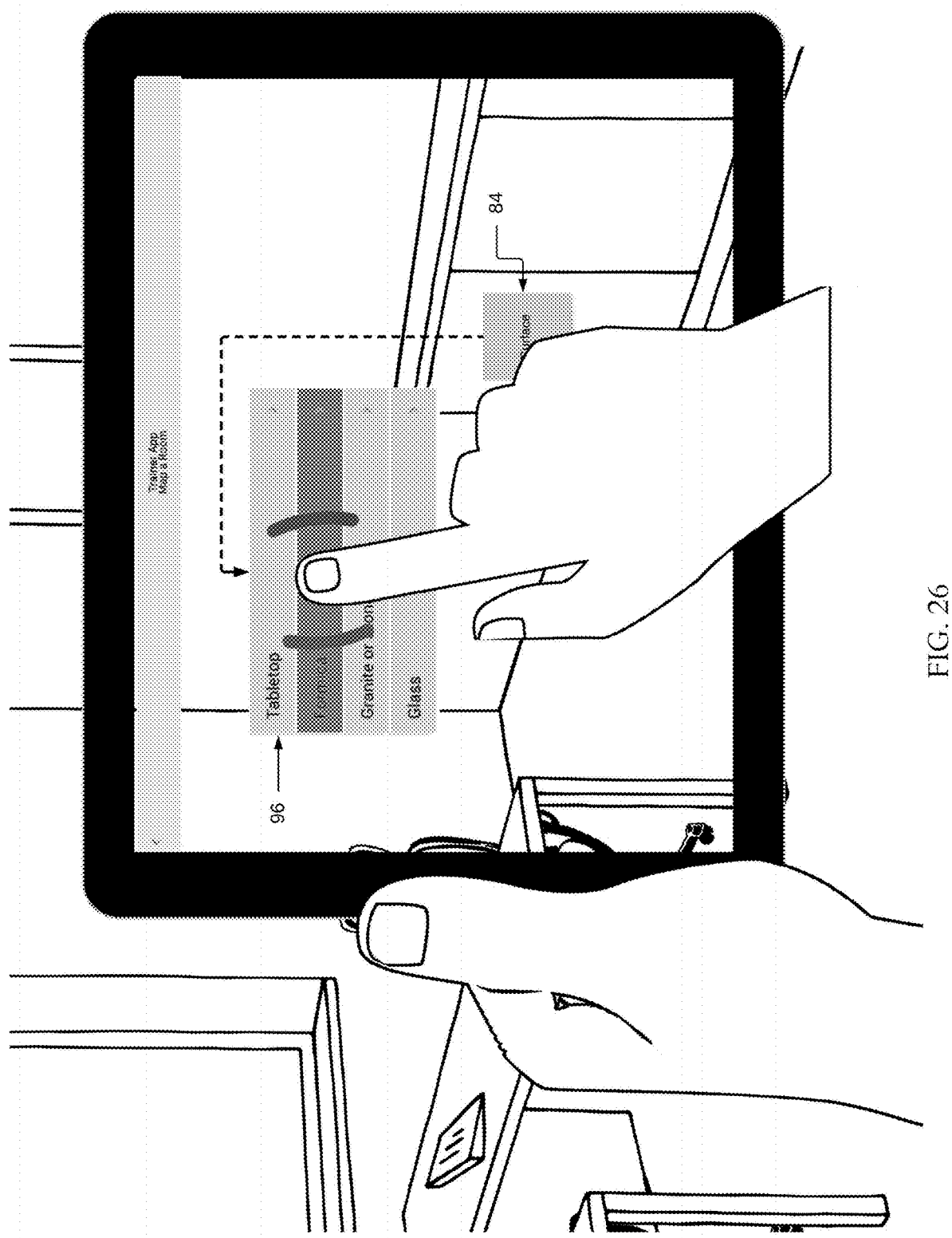
Figure 27:
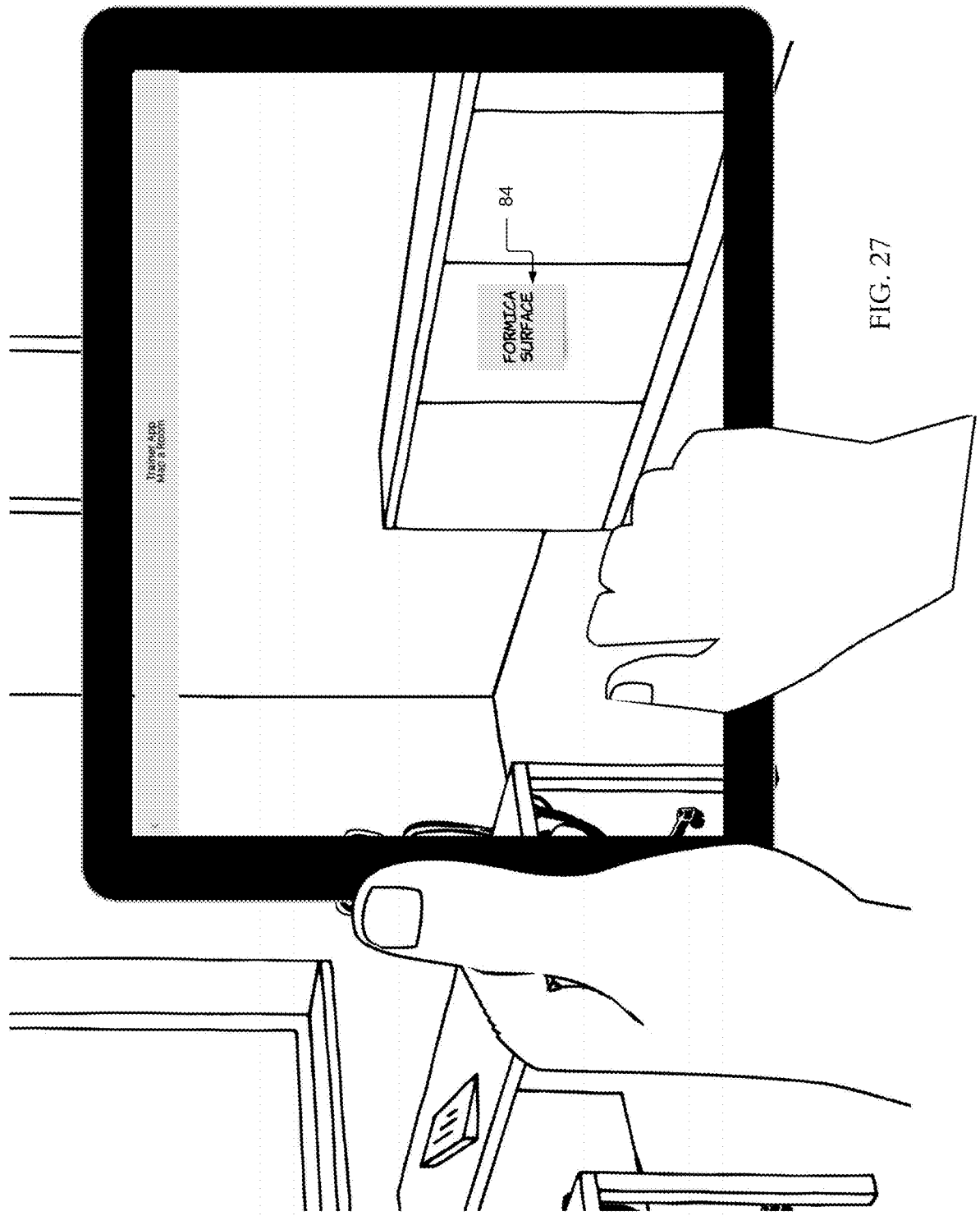

The trainer will select the applicable name of the surface as shown in FIG. 26. Thereafter, the reader 88 will display to the viewer the name or other identifier of the surface to be cleaned for the location 84 (FIG. 27). This process may be repeated for each of the locations 84 to generate a spatial map of the room 82. The reader 88 may then be used by trainees in the manners previously described for training and guidance in the use of janitorial and cleaning products.

With reference now to FIGS. 28-31 there is shown a further embodiment in which a reader 108 may be provided that can directly interface with each location 104 in a room 102 to be cleaned and thereby eliminate the need for the optical tags and the initial placement and removal of the optical tags. The reader 108 otherwise corresponds to the readers 18, 48 and 88 and the locations 104 correspond to the locations 14, 44 and 84.

The reader 108 is programmed to recognize the locations 104, e.g., recognize a glass surface, or a painted wall or a cloth surface or a carpeted surface, and the like, or at least the general nature of the surface, and use this surface recognition capability in place of the optical tags, and thereby link to a website of the type previously described having information about one or more pre-selected janitorial and cleaning products and the use thereof at the locations to be cleaned.

In the shown embodiment, a trainer will initially use the reader 108 to create a spatial map of the room 102. However, instead of there being optical tags in the room, the reader 108 is capable of recognizing the nature of the locations 104.

Figure 28:
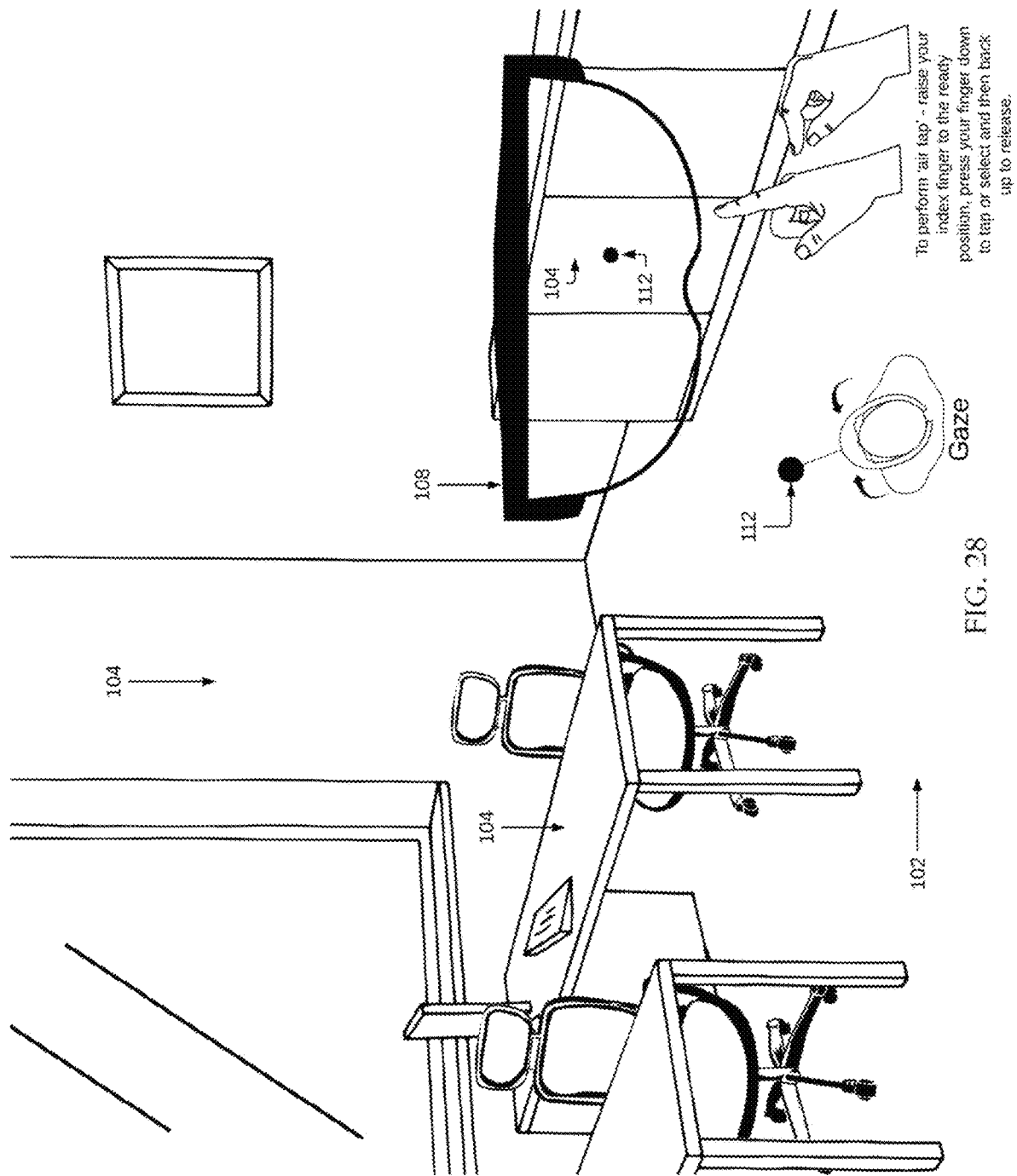
FIGS. 28-31 show aspects of a training system and method according to a further embodiment of the disclosure.
Figure 29:
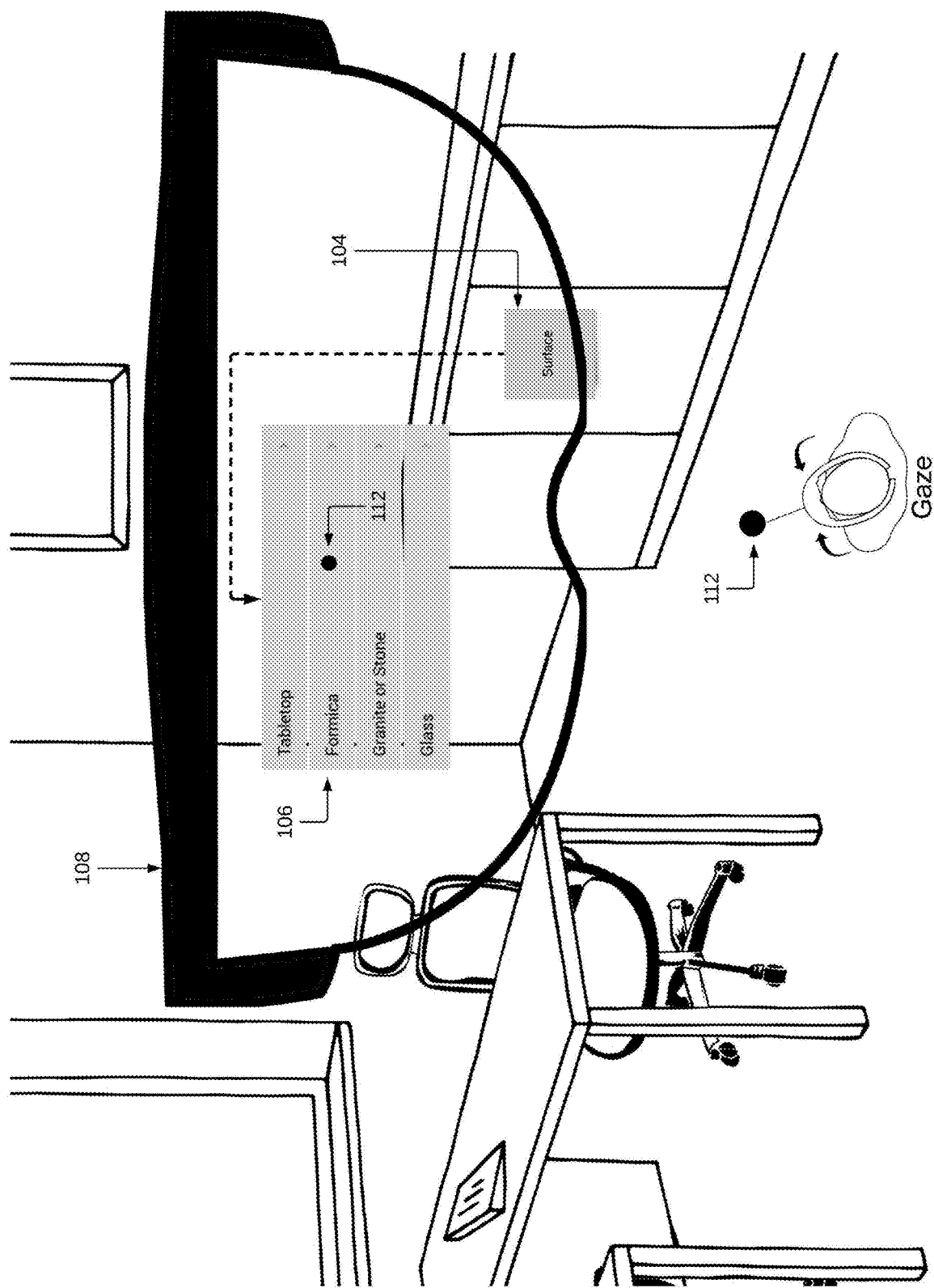

For example, as shown in FIG. 28, the trainer will orient a selection dot 112 or other selector displayed by the reader 108 and which may be directed by head movement to the desired location 104. The trainer may then virtually click on the location 104 as by performing an air tap gesture with their fingers. Next, as shown in FIG. 29, the reader 108 will either recognize the specific surface or recognize a class of surfaces and present a floating menu 106 of surfaces from which the selection dot 112 may be used to select.

Figure 30:
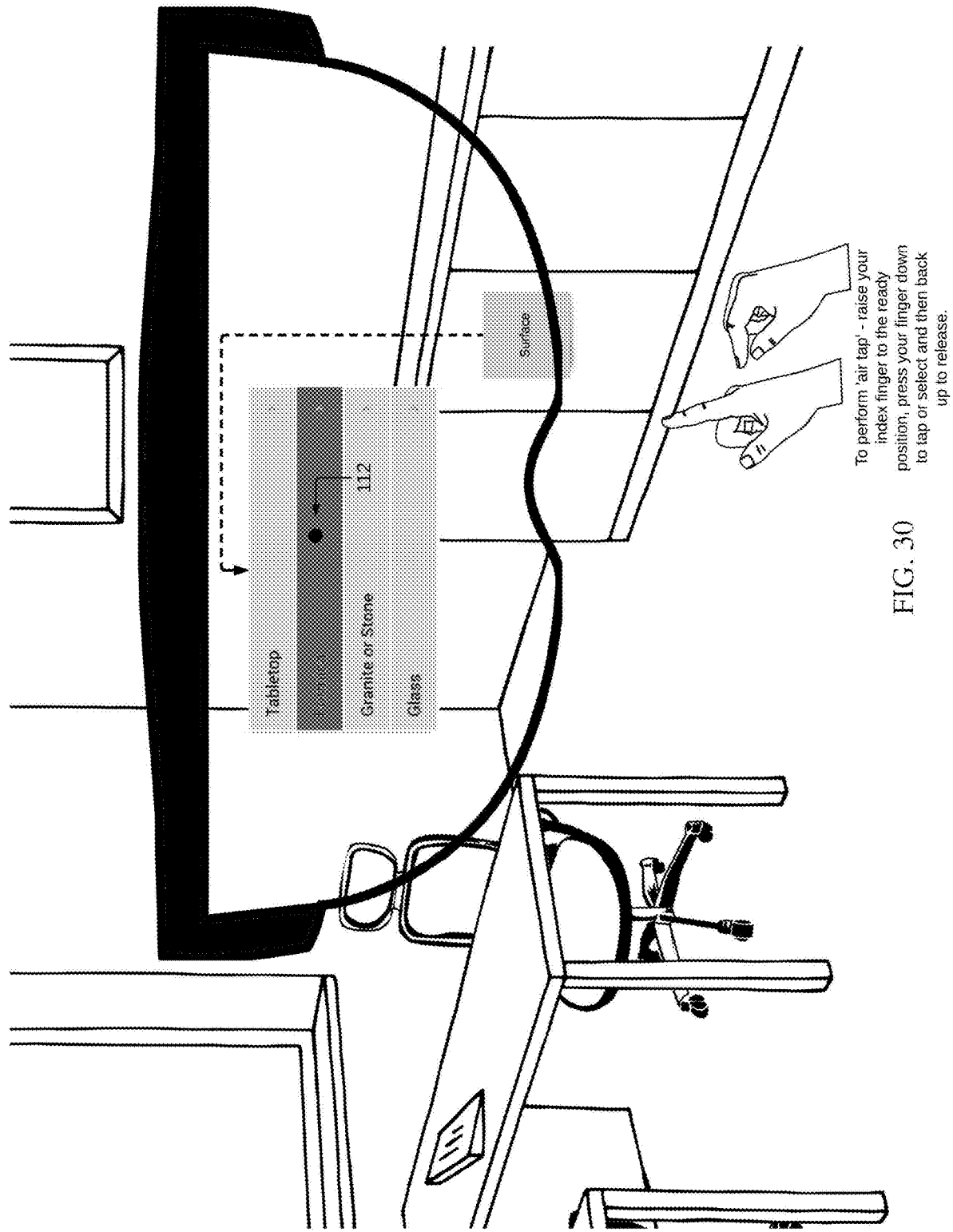
Figure 31:
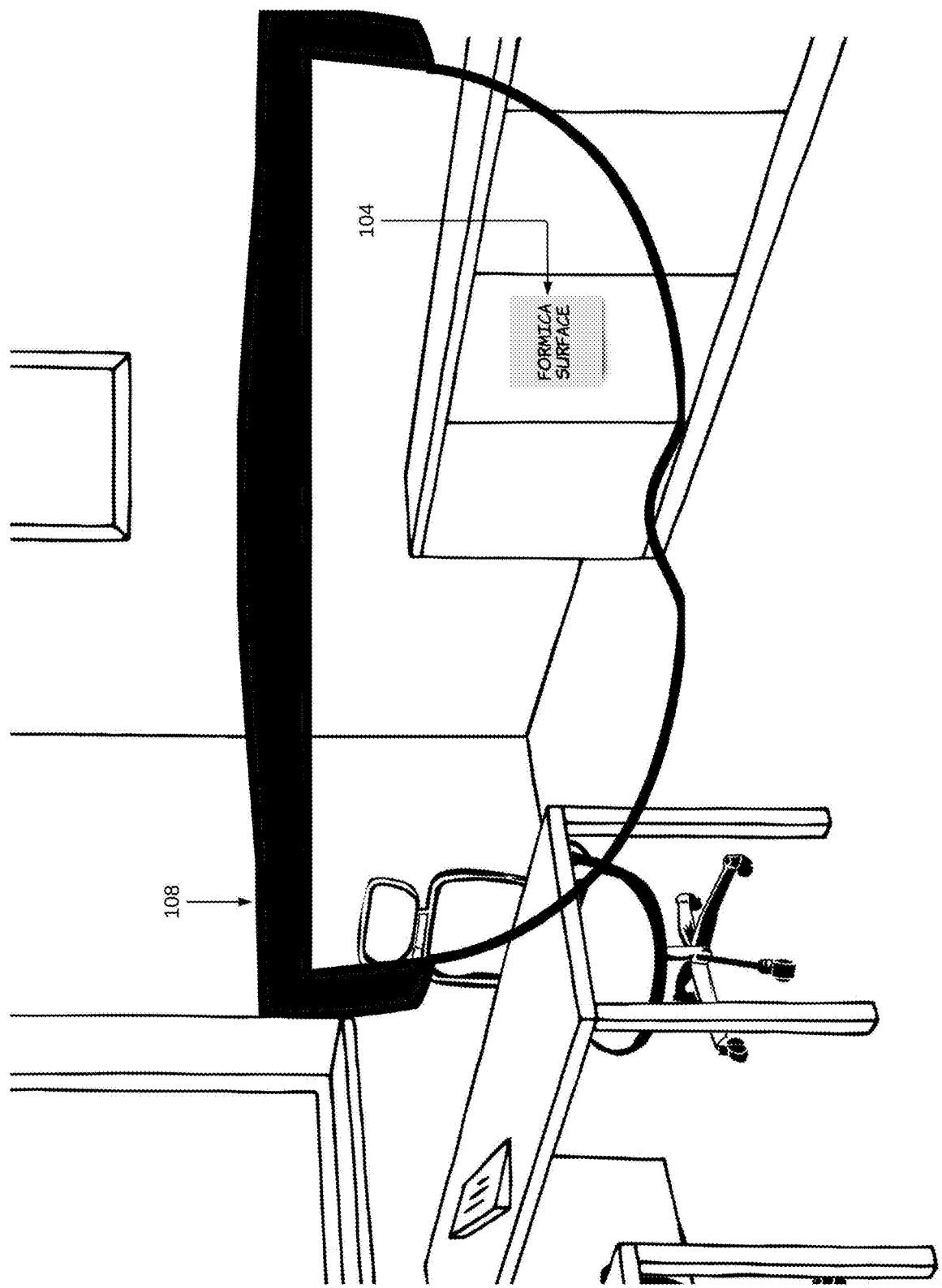

The trainer will select the applicable name of the surface using the selection dot 112 as by an air tap gesture as shown in FIG. 30. Thereafter, the reader 108 will display the name or other identifier of the surface to be cleaned for the location 104 (FIG. 31). This process may be repeated for each of the locations 104 to generate a spatial map of the room 102. The reader 108 may then be used by trainees in the manners previously described for training and guidance in the use of janitorial and cleaning products.

The systems and methods as described herein are configured to be easily adopted and complementary to a commercial janitorial service of the type that utilizes a large staff to effect consistent training among the staff and consistent cleaning of a given room or facility.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method for interactive training, the method comprising the steps of:
   providing a reader programmed to recognize surface characteristics of one or more locations to be cleaned and link to a web site having information about one or more cleaning products;
   operating the reader to recognize surface characteristics of the one or more locations to be cleaned;
   operating the reader to display to a trainee information comprising information from the website about the one or more cleaning products and the use thereof at the one or more locations to be cleaned; and
   having the trainee interact with the displayed information to select amongst the one or more cleaning products and thereby selectively access the displayed information for training in selection and use of the cleaning products.

2. The method of claim 1, wherein each of the cleaning products has a label, the label including a code or other indicia readable by the reader.

3. The method of claim 1, wherein the trainee interacts with at least one label using the reader to link to a website having support materials for the selected cleaning products.

4. The method of claim 1, wherein the one or more locations to be cleaned comprise glass, carpet, hard surfaces, cloth surfaces, and painted surfaces.

5. The method of claim 1, wherein the reader displays to the trainee a name of the location to be cleaned.

6. The method of claim 1, wherein the information from the website comprises training brochures, training posters, product information sheets, product specific webpages, and product training videos configured to facilitate training of the trainee in the selection and use of the cleaning products.

7. A method for interactive training, the method comprising the steps of:
   providing a reader programmed to recognize surface characteristics of locations to be cleaned and link to information about one or more cleaning products and the use thereof at the locations to be cleaned;
   operating the reader to interface with the locations to be cleaned to link to information about one or more of the cleaning products and the use thereof;
   having a trainee operate the reader to selectively display to the trainee displayed information comprising information about the one or more cleaning products and the use thereof at the locations to be cleaned; and
   having the trainee interact with the displayed information to select amongst the one or more cleaning products and thereby selectively access the displayed information for training in selection and use of the cleaning products for one or more of the locations to be cleaned.

8. The method of claim 7, wherein the one or more locations to be cleaned comprise glass, carpet, hard surfaces, cloth surfaces, and painted surfaces.

9. The method of claim 7, wherein the reader displays a name of the location to be cleaned.

* * * * *